US008743291B2

(12) United States Patent
Li et al.

(10) Patent No.: US 8,743,291 B2
(45) Date of Patent: Jun. 3, 2014

(54) QUALITY ASSESSMENT FOR IMAGES THAT HAVE EXTENDED DYNAMIC RANGES OR WIDE COLOR GAMUTS

(75) Inventors: Zhen Li, Cupertino, CA (US); Walter Gish, Oak Park, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/009,773

(22) PCT Filed: Apr. 12, 2012

(86) PCT No.: PCT/US2012/033318
§ 371 (c)(1),
(2), (4) Date: Oct. 3, 2013

(87) PCT Pub. No.: WO2012/142285
PCT Pub. Date: Oct. 18, 2012

(65) Prior Publication Data
US 2014/0022460 A1    Jan. 23, 2014

Related U.S. Application Data

(60) Provisional application No. 61/474,647, filed on Apr. 12, 2011.

(51) Int. Cl.
*H04N 9/64* (2006.01)
*H04N 9/67* (2006.01)
*H04N 11/20* (2006.01)
*G09G 5/02* (2006.01)

(52) U.S. Cl.
USPC ............ 348/708; 348/453; 348/659; 345/604; 345/603

(58) Field of Classification Search
CPC ............. H04N 5/14; H04N 5/52; H04N 5/20; H04N 5/202; H04N 5/57; H04N 1/6058; H04N 11/20; H04N 7/01; H04N 9/64; G06K 9/00; G09G 5/00; G09G 3/02; G09G 2340/06; G09G 2320/066; G09G 2320/0673

USPC ......... 348/671–686, 453, 454, 459–661, 708; 382/169; 345/589–605

See application file for complete search history.

(56) References Cited

U.S. PATENT DOCUMENTS 5,394,483 A    2/1995    Daly
6,360,022 B1   3/2002    Lubin
(Continued)

FOREIGN PATENT DOCUMENTS

EP    1294199    3/2003
EP    1947609    7/2008
(Continued)

OTHER PUBLICATIONS

Guarnieri, G. et al., "NonLinear Mapping of the Luminance in Dual-Layer High Dynamic Range Displays" Proc. of the SPIE—The International Society for Optical Engineering, v 7245, Conference: Image Processing: Algorithm and Systems, Jan. 19-22, 2009, San Jose.

(Continued)

*Primary Examiner* — Michael Lee

(57) ABSTRACT

A first video signal is accessed, and represented in a first color space with a first color gamut, related to a first dynamic range. A second video signal is accessed, and represented in a second color space of a second color gamut, related to a second dynamic range. The first accessed video signal is converted to a video signal represented in the second color space. At least two color-related components of the converted video signal are mapped over the second dynamic range. The mapped video signal and the second accessed video signal are processed. Based on the processing, a difference is measured between the processed first and second video signals. A visual quality characteristic relates to a magnitude of the measured difference between the processed first and second video signals. The visual quality characteristic is assessed based, at least in part, on the measurement of the difference.

13 Claims, 18 Drawing Sheets

(56) References Cited

U.S. PATENT DOCUMENTS

| | | |
|---|---|---|
| 6,654,504 B2 | 11/2003 | Lubin |
| 6,678,424 B1 | 1/2004 | Ferguson |
| 6,690,839 B1 | 2/2004 | Ferguson |
| 6,907,143 B2 | 6/2005 | Ferguson |
| 6,941,017 B2 | 9/2005 | Ferguson |
| 7,305,144 B2 | 12/2007 | Fattal |
| 7,545,985 B2 | 6/2009 | Zhang |
| 7,590,287 B2 | 9/2009 | Lu |
| 8,265,378 B2 | 9/2012 | Whitehead |
| 2004/0175056 A1 | 9/2004 | Lee |
| 2005/0281333 A1 | 12/2005 | Ghanbari |
| 2006/0104533 A1 | 5/2006 | Daly |
| 2006/0152585 A1 | 7/2006 | Bourret |
| 2006/0268980 A1 | 11/2006 | Le Dinh |
| 2007/0088516 A1 | 4/2007 | Wolf |
| 2007/0257988 A1 | 11/2007 | Ong |
| 2008/0025400 A1 | 1/2008 | Sugimoto |
| 2009/0027558 A1 | 1/2009 | Mantiuk |
| 2009/0060027 A1 | 3/2009 | Ferguson |
| 2009/0116713 A1 | 5/2009 | Yan |
| 2009/0273677 A1 | 11/2009 | Huynh-Thu |
| 2010/0172411 A1* | 7/2010 | Efremov et al. ......... 375/240.12 |
| 2011/0194618 A1 | 8/2011 | Gish |
| 2013/0027615 A1 | 1/2013 | Li |
| 2013/0148029 A1 | 6/2013 | Gish |

FOREIGN PATENT DOCUMENTS

| | | |
|---|---|---|
| EP | 2077527 | 7/2009 |
| WO | 9830979 | 7/1998 |
| WO | 2008048155 | 4/2008 |
| WO | 2009091530 | 7/2009 |

OTHER PUBLICATIONS

Liu, M. et al., "Image Quality Assessment Using Contourlet Transform" Optical Engineering, v 48, No. 10, 2009.

Richter, T. "On The mDCT-PSNR Image Quality Index" International Workshop on Quality of ultimedia Experience, 2009, published by IEEE, NJ, USA.

Ndjiki-Nya, P. et al., "Efficient Full-Reference Assessment of Image and Video Quality" Proc. International Conference on Image Processing, v. 2, pp. II125-II128, Sep. 16-19, 2007.

Ivkovic, G. et al., "An Algorithm for Image Quality Assessment" Acoustics, Speech, and Signal Processing, 2004, vol. 3, pp. 713-716.

Wang, Z. et al., "Mean Squared Error: Love it or Leave it?" IEEE Signal Processing Magazine, Jan. 2009, pp. 98-117.

Mantiuk, D. et al. "Predicting Visible Differences in High Dynamic Range Images—Model and Its Calibration" Proceedings of Human Vision and Electronic Imaging X, IS & T/SPIE 17th Annual Symposium on Electronic Imaging 2005, pp. 204-214.

Poynton, C. "Digital Video and HDTV: Algorithms and Interfaces" Morgan Kaufman Publishers, 2004.

ITU709 "Parameters Values for the HDTV Standards for Production and International Programme Exchange" Recommendation ITU-R, BT.709-5, (Apr. 2002).

Reinhard, E. et al., "Photographic Tone Reproduction for Digital Images" Proc. of Siggraph 2002, ACM Trans. Graphics, 21(3), 267-276, Aug. 2002.

Reinhard, E., "High Dynamic Range Imaging: Acquisition, Display, and Image-Based Lighting", Morgan Kauffmann Publishers, San Francisco, 2005.

Wang, Z. et al., "Image Quality Assessment: from Error Visibility to Structural Similarity" IEEE Transactions on Image Processing, vol. 13, No. 4, pp. 600-612, Apr. 2004.

Caron B. "Facility for Subjective Evaluation of Advanced Television in North America" Television Measurements, 1991, Fourth International Conference on Montreux, Switzerland, London, Jan. 1, 1991, p. 8.

Banterle, F., et al. "High Dynamic Range Imaging and Low Dynamic Range Expansion for Generating HDR Content" 2009, Computer Graphics Forum, vol. 28, No. 8, pp. 2343-2367.

* cited by examiner

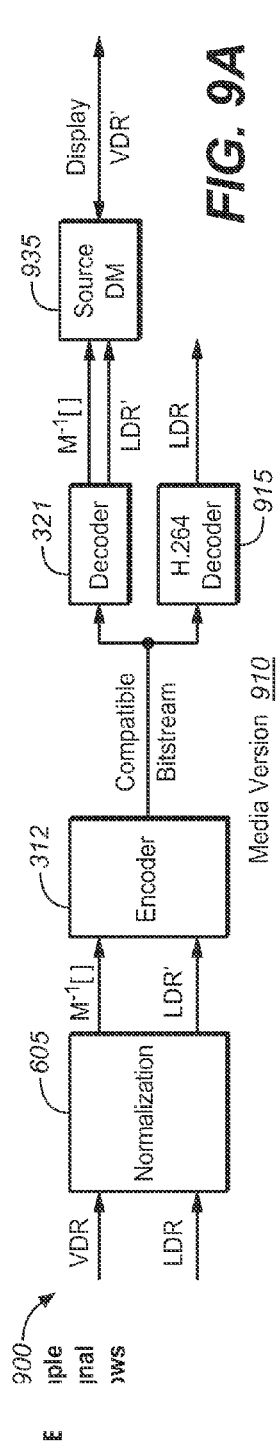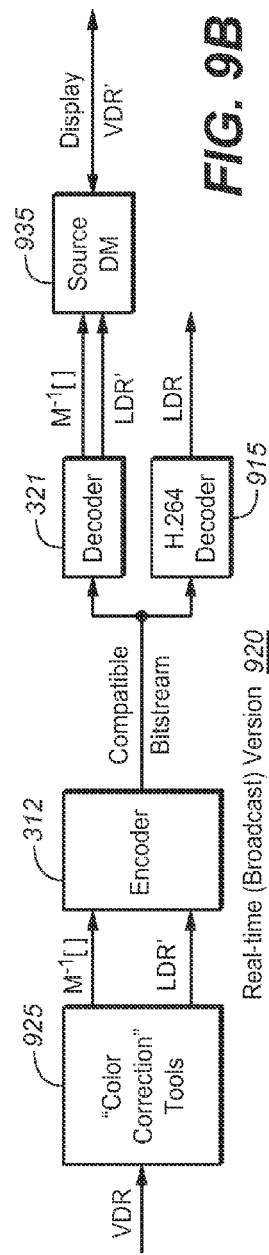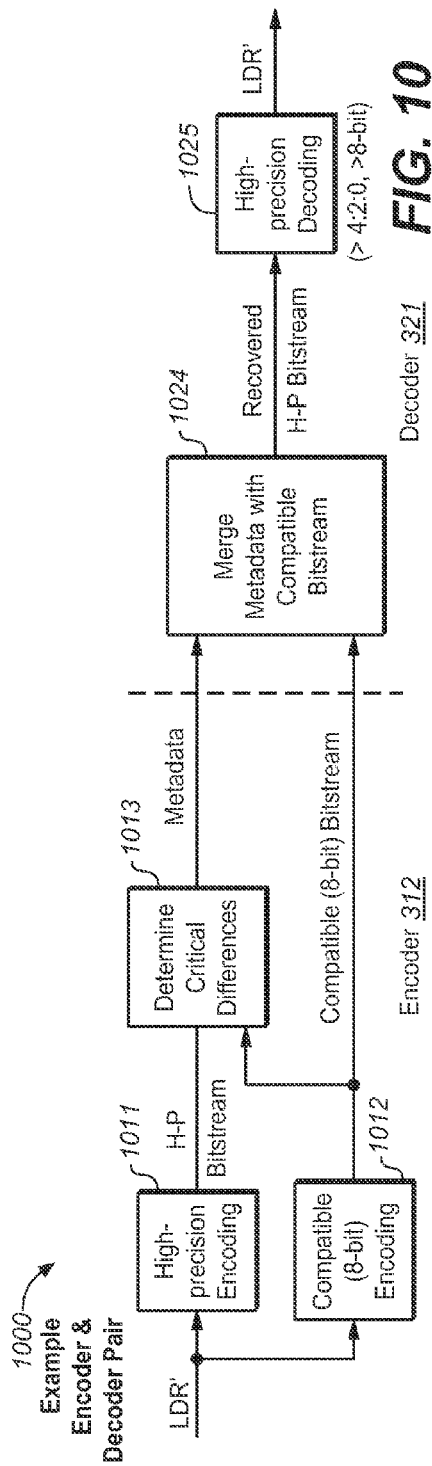

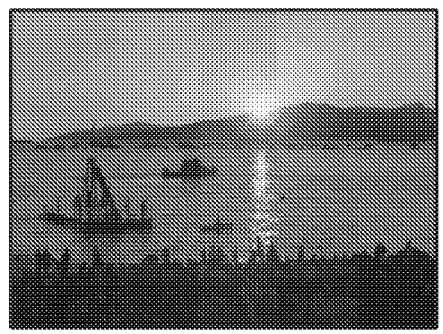
2201 — FIG. 22A
Example Test Sequence Portion Adjacent Images
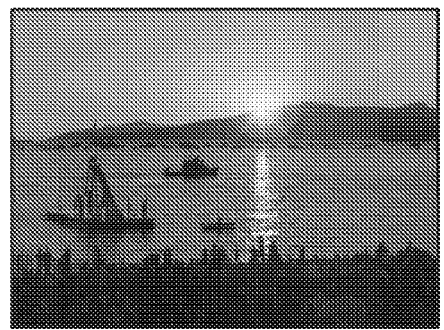
2202 — FIG. 22B
Example Test Sequence Portion Adjacent Images
2205 — FIG. 22C
Example Difference Maps
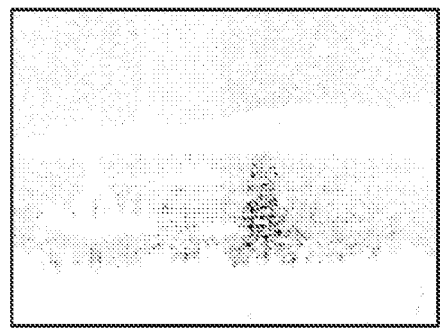
2206 — FIG. 22D
Example Difference Maps

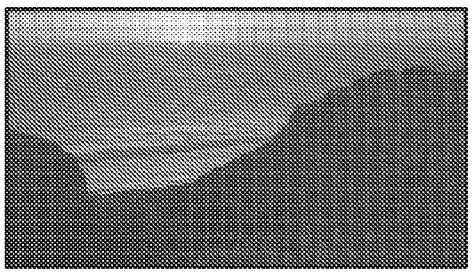

Example Test Sequence Portion
Adjacent Images & Visual Quality
Assessment Difference Maps

FIG. 23A

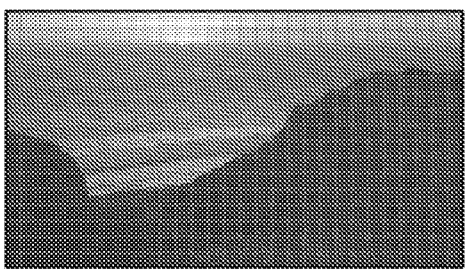

Example Test Sequence Portion
Adjacent Images & Visual Quality
Assessment Difference Maps

FIG. 23B

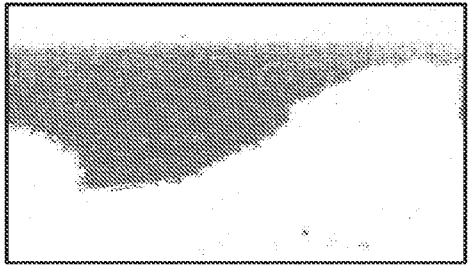

Example Test Sequence Portion
Adjacent Images & Visual Quality
Assessment Difference Maps

FIG. 23C

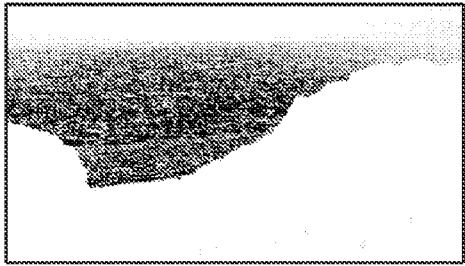

Example Test Sequence Portion
Adjacent Images & Visual Quality
Assessment Difference Maps

FIG. 23D

Example Test Sequence Portion
Adjacent Images & Visual Quality
Assessment Difference Maps

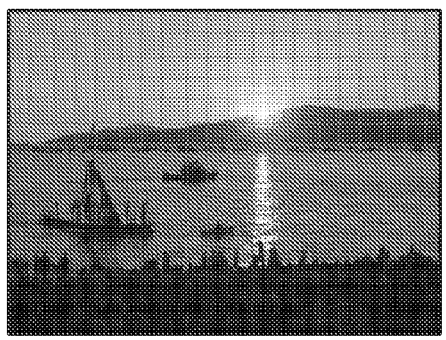

2401 — FIG. 24A

Example Test Sequence Portion
Adjacent Images & Visual Quality
Assessment Difference Maps

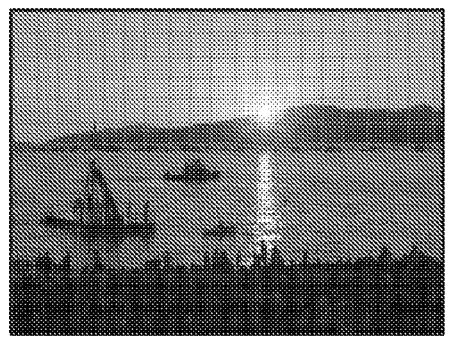

2402 — FIG. 24B

Example Test Sequence Portion
Adjacent Images & Visual Quality
Assessment Difference Maps

2405 — FIG. 24C

Example Test Sequence Portion
Adjacent Images & Visual Quality
Assessment Difference Maps

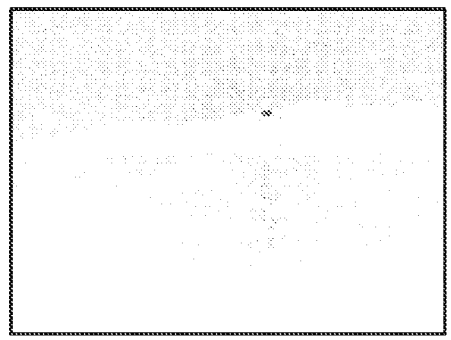

2406 — FIG. 24D

QUALITY ASSESSMENT FOR IMAGES THAT HAVE EXTENDED DYNAMIC RANGES OR WIDE COLOR GAMUTS

CROSS-REFERENCE TO RELATED APPLICATIONS

This application claims priority to U.S. Provisional Patent Application No. 61/474,647 filed on 12 Apr. 2011, which is incorporated herein by reference in its entirety.

This application is also related to co-pending International Patent Application No. PCT/US2011/032982 filed 19 Apr. 2011 and co-pending International Patent Application No. PCT/US2011/048861 filed 23 Aug. 2011, each of which is incorporated herein by reference in its entirety.

TECHNICAL FIELD

The present invention relates generally to images and video. More particularly, an embodiment of the present invention relates to assessing image quality over extended dynamic ranges and/or wide color gamuts.

BACKGROUND OF THE INVENTION

Image Dynamic Range and Color Gamut

As used herein, the term dynamic range may relate to the range of luminance (e.g., intensity) in an image. The dynamic range in real-world scenes is large. Different image and video applications in use today for the capture, representation, and presentation of image and video signals may have different dynamic ranges. For example, photographic negatives can have a relatively large dynamic range, while photographic prints, some currently existing (e.g., conventional) television (TV) sets and computer monitors may have a smaller dynamic range.

As used herein, the term "standard dynamic range" (SDR) (sometimes referred to as "low dynamic range" or "LDR") may relate to the dynamic range associated with many current TVs or monitor displays. In contrast to SDR images, high dynamic range (HDR) images contain essentially all of the dynamic range in an original scene on which the HDR image is based. SDR images are typified by the images rendered with the 8-bit displays in widespread use today. HDR images may be rendered with 10-14 bit displays.

For a number of applications such as compression for distribution and display, encoding HDR may not be necessary and may in fact be somewhat computationally expensive and/or bandwidth consumptive. However, for some of these modern applications, SDR images may simply not suffice for all purposes. Instead, such applications may more advantageously use, create, store, transmit or render images that may be characterized by a Visual Dynamic Range (VDR). VDR images encompass essentially all of the luminance and color that a typical human visual system (HVS) can simultaneously perceive (e.g., visually perceive at any given time).

The entire range of human-visible luminance essentially spans the HDR range. In contrast, the range of luminance that is simultaneously visible comprises the VDR range, which while somewhat narrower than the entire HDR range, still covers a significant span. In further contrast to the HDR and VDR however, the range of a typical 8-bit gamma-mapped displays spans the SDR, range.

As used herein, the term color gamut may relate to a certain subset of colors; e.g., in relation to human visual perception and/or the color reproduction capability of a given display device. Color gamuts are commonly represented as areas within the CIE 1931 chromaticity diagram, which is familiar to artisans skilled in fields related to color science and arts, images, video, displays, cinematography and photography (e.g., "color, image and video"). Artisans skilled in these fields realize that a more-or-less "horseshoe" shaped region of the CIE 1931 chromaticity diagram represents is the entire range of possible chromaticities.

For any display device however, there are physical limits to the set of colors that can be reproduced or displayed. For example, existing display devices such as a cathode ray tube (CRT), liquid crystal display (LCD), or plasma display typically cover only a relatively small area in the entire color space. With reference to the CIE 1931 chromaticity diagram, artisans skilled in the color, image and video fields recognize that the color gamut available in most conventional devices may be represented as a triangle shape, within the entire, significantly (e.g., substantially) larger horseshoe shape area of the CIE 1931 chromaticity diagram, which represents an entire range of possible chromaticities that may exist. Certain colors that cannot be displayed, rendered or reproduced within a particular color model may be referred to herein as out of gamut. Additional processing is typically needed to handle, reproduce and display these colors. Such additional processing may be referred herein to as gamut mapping. As used herein, the term wide color gamut (WCG) may relate to a color gamut that encompasses more color than the devices delimited to the smaller triangle within the horseshoe shape of the CIE 1931 chromaticity diagram and, essentially at a limit, all the colors that the HVS is capable of perceiving.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 9A and FIG. 9B depict example signal flows, according to an embodiment of the present invention;

FIG. 10 depicts a matched encoder/decoder pair, according to an embodiment of the present invention;

FIG. 22A, FIG. 22B, FIG. 23A, FIG. 23B, FIG. 24A and FIG. 24B depict example comparisons of test sequence images, made according to an embodiment of the present invention;

FIG. 22C, FIG. 22D, FIG. 23C, FIG. 23D, FIG. 24C and FIG. 24D depict example comparisons of difference maps, according to an embodiment of the present invention;

DESCRIPTION OF EXAMPLE EMBODIMENTS

Assessing image quality over extended dynamic ranges and/or wide color gamuts is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to assessing image quality over extended dynamic ranges and/or wide color gamuts. In an example embodiment, a first video signal is accessed, which is represented in a first color space with a first color gamut that is related to a first dynamic range. A second video signal is accessed, which is represented in a second color space of a second color gamut. The second color space is associated with a second dynamic range. The first accessed video signal is converted to a video signal that is represented in the second color space of the second color gamut with the second dynamic range. At least two color-related components of the converted video signal are mapped over the second dynamic range. The mapped first accessed video signal and the second accessed video signal are processed. Based at least in part on the processing of the mapped first accessed video signal and the second accessed video signal, a difference is measured, which may exist between the processed first and second video signals. A visual quality characteristic relates to a magnitude of the measured difference between the processed first and second video signals. The visual quality characteristic is assessed based, at least in part, on the measurement of the difference, which may be measured to exist between the processed first and second video signals.

Figure 15:
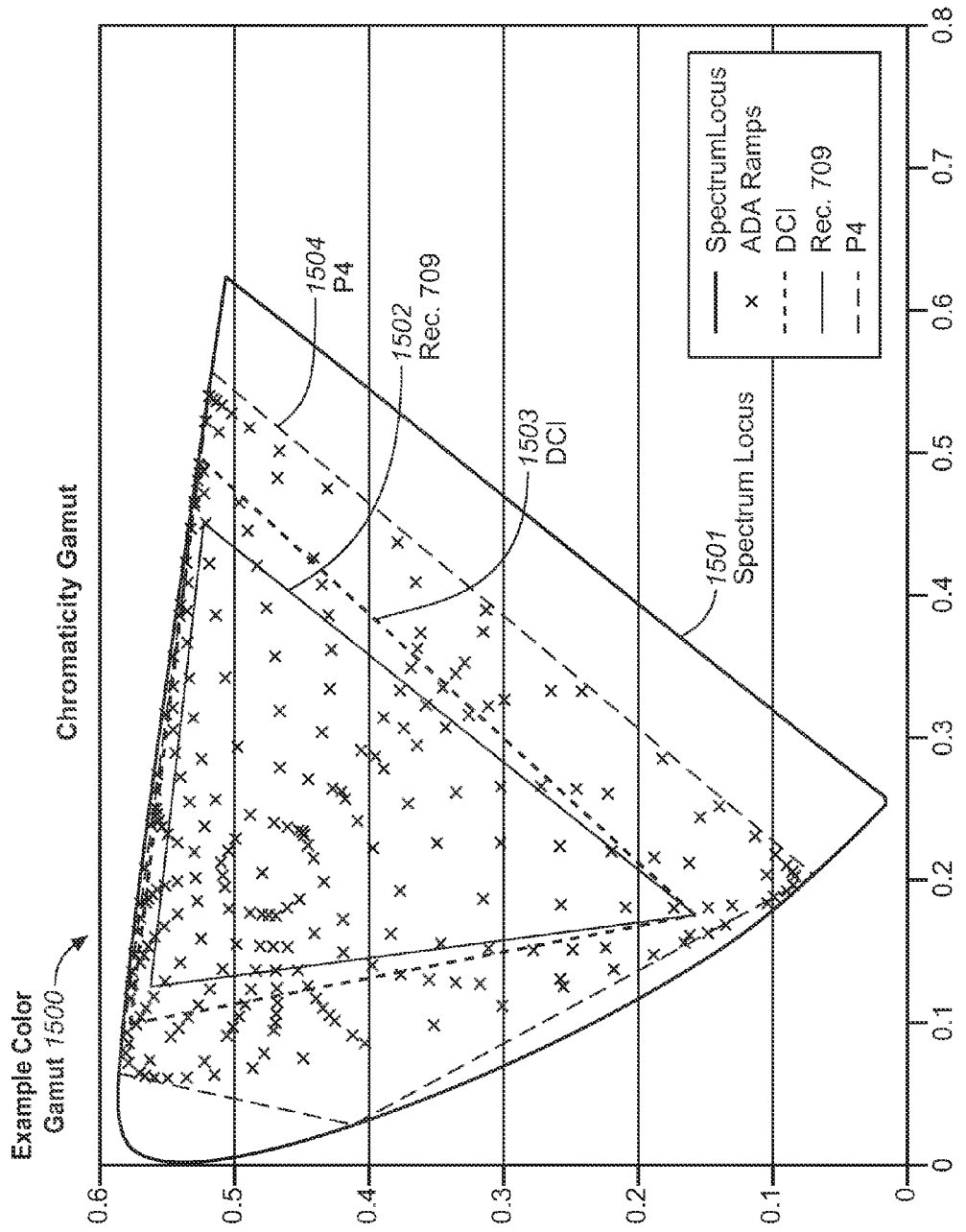
FIG. 15 depicts an example color gamut, according to an embodiment of the present invention.
Figure 16:
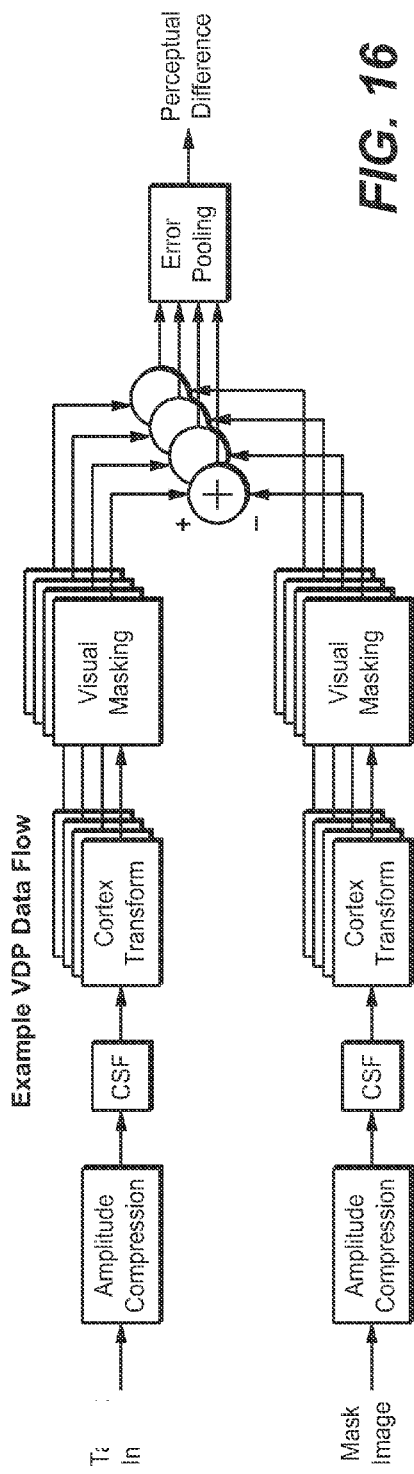
FIG. 16 depicts an example of VDP, with which an embodiment of the present invention may be practiced.

An example embodiment, which relates to assessing image quality over extended dynamic ranges and/or wide color gamuts, is described commencing with Section II at FIG. 16 herein. Presented first, Section I with FIGS. 1-15 describes an example of a process for enhancing image dynamic range, to provide context for and to, and additional material relating to the description of assessing image quality over extended dynamic ranges and/or wide color gamuts. An example embodiment assesses image quality over extended dynamic ranges and/or wide color gamuts associated with VDR, HDR, SDR' and/or WCG images and video frames that are produced using the example approaches, techniques and processes described in Section I. It should be understood and apparent to artisans skilled in fields related to the image, video, color science, photographic and similar arts however that the description in Section I is provided merely by way of example and to provide context in which to describe an example embodiment and is expressly not to be construed or confused as a limitation to embodiments in any sense. On the contrary, artisans skilled in the relevant fields should recognize that an embodiment of the present invention is well suited to assess image quality over extended dynamic ranges and/or wide color gamuts over VDR, HDR, SDR' and/or WCG images and video frames that may be produced using any of a variety of other approaches, techniques and/or processes.

Section I

Enhancing Image Dynamic Range

Example Process

Figure 1:
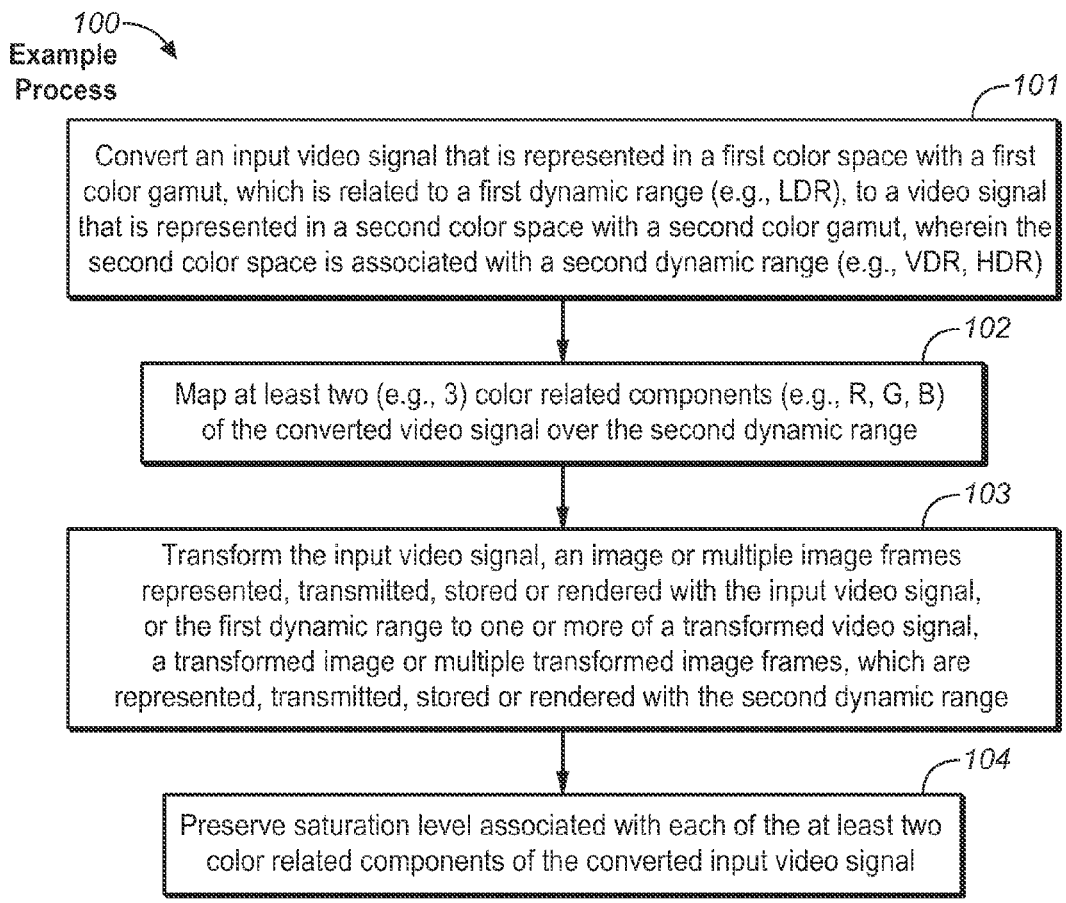
FIG. 1 depicts a flowchart for an example process, according to an embodiment of the present invention.

An embodiment relates to a process for enhancing image dynamic range. FIG. 1 depicts a flowchart for an example process 100, according to an embodiment of the present invention. An embodiment converts 101 an input video signal that is represented in a first color space with a first color gamut, which is related to a first dynamic range, to a video signal that is represented in a second color space with a second color gamut. The second color space is associated with a second dynamic range. At least two color-related components of the converted video signal are mapped 102 over the second dynamic range.

The second dynamic range may be greater (e.g., may span a wider, broader or deeper range) than the first dynamic range. The second dynamic range, on an intra-frame basis in relation to the video signal, may span or approximate a range of color and/or intensity that may be simultaneously perceivable by the normal human visual system (HVS). As used herein in this sense, the term 'normal' may relate to one or more of a statistical, psychometric, biometric or opthamological connotation, diagnosis, evaluation, deduction or inference.

The first dynamic range may span or approximate a range of color and/or intensity that is capable of rendering with one or more of a standard or low dynamic range (SDR) monitor or display, a cathode ray tube (CRT) monitor or display, or a conventional LCD, e.g., with an unmodulated solid white BLU. The second color gamut (of the second color space) may be greater than the first color gamut (of the first color space).

Based on the conversion and the mapping, one or more of the input video signal, an image or plurality of image frames represented, transmitted, stored or rendered with the input video signal, or the first dynamic range is transformed 103 into one or more of a transformed video signal, a transformed image or multiple transformed image frames, which are represented, transmitted, stored or rendered with the second dynamic range.

The first color space and/or the second color space may comprise a 'red/green/blue' (RGB) color space. The RGB color space has three color-related components. The color-related components comprise a red component, a green component and a blue color component. The mapping step may comprise mapping the three color-related components of the converted video signal over the second dynamic range. The first color space may substantially conform to a RGB color space that is associated with the BT.709 Recommendation standard of the International Telecommunications Union (ITU). The second color space may substantially conform to at least one of the RGB color spaces that are associated with the Academy Color Encoding Specification (ACES) standard of the Academy of Motion Picture Arts and Sciences (AMPAS), the P3 color space standard (e.g., Society of Motion Picture and Television Engineers, SMPTE references: Rp431-2-2007; Eg432-1-2007) of the Digital Cinema Initiative (DCI), or the Reference Input Medium Metric/Reference Output Medium Metric (RIMM/ROMM) standard.

The mapping step may comprise performing a global mapping operation over the at least two color-related components of the converted input video signal. The mapping step may comprise performing a global mapping operation over three color-related components of the converted video signal.

An embodiment preserves a saturation level 104 associated with each of the at least two (e.g., or three) color-related components of the converted input video signal. Saturation level preservation may comprise mapping an intensity value associated with the input video signal over the second dynamic range. The intensity value may comprise a luma or a luminance related characteristic of the converted video signal.

The intensity value may be scaled according to a first gain setting. The first gain setting may have a value between 10 and 20 percent in relation to a value associated with a color, chrominance or chroma related characteristic of the at least two (e.g., three) color-related components of the converted video signal. In an embodiment, the value of the first gain setting may equal or approximate 15 percent (15%) in relation to the value associated with the color, chroma or chrominance characteristic of the at least two (e.g., three) color-related components of the converted video signal.

In an embodiment, the mapping step is invertible in relation to the first dynamic range and color space and the second dynamic range and color space. The mapping may include normalizing a first image, with which a scene is encoded in the video signal with the first dynamic range, with a second image, with which the scene is renderable or displayable with the second dynamic range. The mapping step may be losslessly invertible. The converting step and/or the mapping step may include concatenating one or more of multiple matrices, such as a three-by-three (3×3) array, or multiple invertible non-linear mappings, such as a tone mapping operator, or TMO (which may be losslessly invertible with an inverse TMO—iTMO that is complimentary or supplementary, or corresponds in some similar way, to the TMO). An additional or alternative embodiment may similarly function with a linear, linearized, substantially linear, or approximately linear (e.g., "essentially linear") mapping.

The converted video signal may comprise a high precision VDR version of the content. The input video signal may comprise a low precision SDR version of the content. The mapping step may include estimating a high precision SDR version of the content. The estimating step may include generating an iterative series of estimations of the high precision SDR version of the content. The generating step may include recursively updating the high precision SDR version of the content and/or the mapping. The mapping may thus comprise an inter-layer mapping between the high precision VDR version of the content and the low precision SDR version of the content or the high precision SDR version of the content.

The high precision VDR content and/or the high precision SDR content version may comprise a first bit precision range. The first bit precision range may include a bit range of at least 12 bits; between 12 bits and 14 bits, inclusive; at least 14 bits; or 14 bits or more. The low precision SDR content version may comprise a second bit precision range. The second bit precision range may include a bit range of 10 bits; less than 10 bits; or a bit precision that is less than the first bit precision.

The mapping step may be preceded with a blind computation and/or an informed computation. The blind computation may include filtering the SDR content version. Filtering of the SDR content version may include removing one or more contouring artifacts that are perceivable in one or more smooth regions of an image of the video content. An embodiment may use a bilateral filter on the SDR content version. The informed computation may include an estimation of the high precision SDR content version. Estimating the high precision SDR content version may include an iterative computation. The iterative computation may include recursively updating the high precision SDR and the mapping, in which the mapping comprises an inter-layer mapping.

An embodiment of the present invention thus obviates both the base layer/enhancement layer approach and the use of global mapping operators or other predictors that are based on image intensity values (such as pixel luminance or luma) in the enhancement of image dynamic range. Process 100 may include a mapping of an SDR content version to a VDR content version.

Example SDR to VDR Mapping

Figure 2:
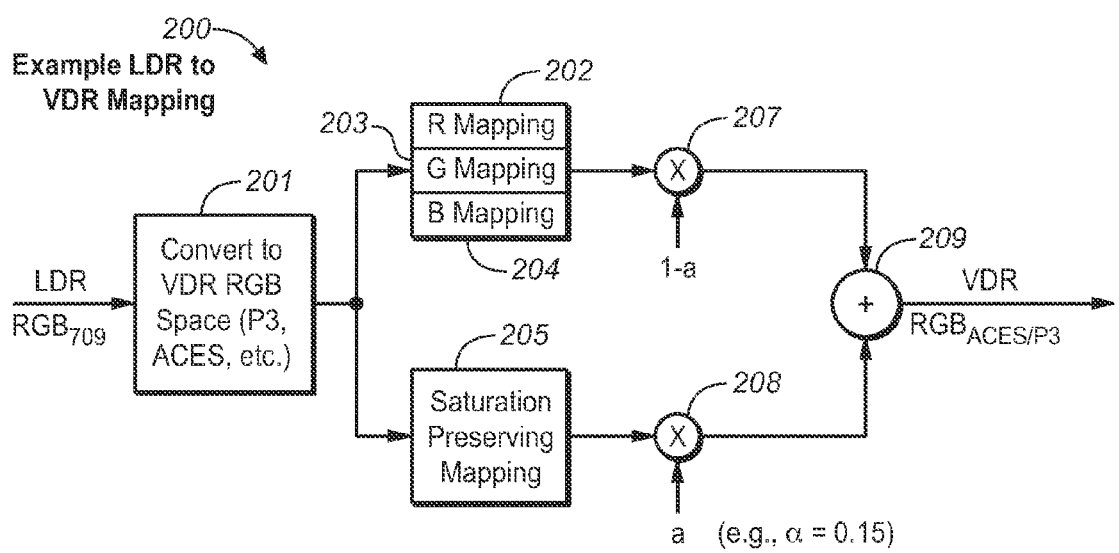
FIG. 2 depicts example mapping between an SDR content version and a VDR content version, according to an embodiment of the present invention.

FIG. 2 depicts an example mapping 200 between an SDR content version and a VDR content version, according to an embodiment of the present invention. A video signal that includes an SDR content version is input to a converter 201. Converter 201 converts the input SDR content version between different color spaces. For example, the input color space and the conversion color space may both comprise an RGB color space, which has three color-related components: a red component, a green component and a blue color component. The input color space may substantially conform to a RGB color space that is associated with the ITU BT.709. The conversion color space may substantially conform to at least one of the RGB color spaces that are associated with the AMPAS 'ACES' color space standard, the DCI 'P3' color space standard, or the RIMM/ROMM color space standard.

In an embodiment, the SDR to VDR mapping is performed over each of the color-related components. Thus, the red component 202, the green component 203 and the blue color component 204 are mapped over the VDR content version.

An embodiment preserves a saturation level associated with the color-related components of the converted input video signal. Saturation level preservation may comprise mapping 205 an intensity value associated with the input video signal over the second dynamic range. The intensity value may comprise a luma or a luminance related characteristic of the converted video signal. The intensity value may be scaled according to a first gain setting 208 'α' (alpha).

The first gain setting 208 may have a value between 10 and 20 percent in relation to a value associated with a color, chrominance or chroma related characteristic of the at least two (e.g., three) color-related components of the converted video signal. In an embodiment, the value of the first gain setting 208 may equal or approximate 15 percent (15%) in relation to the value associated with the color, chroma or chrominance characteristic of the at least two (e.g., three) color-related components of the converted video signal. Gain setting 208 may have another value (e.g., ranging from a fraction of 1% to approximately 100%) in relation to the value associated with a color, chrominance or chroma related characteristic of the at least two (e.g., three) color-related components of the converted video signal.

The red component mapping 202, the green component mapping 203 and the blue color component mapping 204 may be scaled according to a gain setting of (1-α). The scaled color component mappings and the scaled saturation-preserving scaled intensity value are summed 209 to generate the VDR content version, with high precision color space information (e.g., ACES and/or P3).

Example Architecture

Figure 3A:
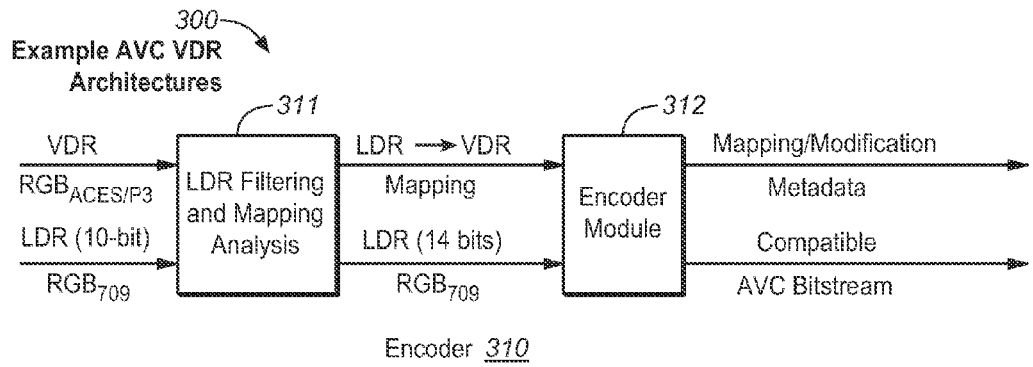
FIG. 3A and FIG. 3B depict an example VDR architecture, according to an embodiment of the present invention.
Figure 3B:
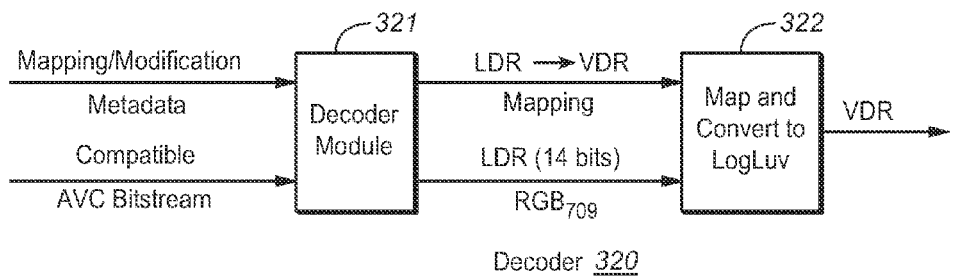

FIG. 3A and FIG. 3B depict an example VDR architecture 300, according to an embodiment of the present invention. VDR architecture 300 includes an encoder 310 and a decoder 320. Encoder 310 includes a SDR filtering and mapping analysis 311 and encoder module 312. SDR filtering and mapping analysis 311 receives an input that includes wide gamut color space information (e.g., ACES and/or P3) and SDR content with, e.g., a 10-bit or lower bit depth. The SDR content also has relatively smaller gamut color space information (e.g., ITU BT.709). SDR filtering and mapping analysis 311 provides an intermediate output to encoder module 312.

The intermediate output includes a mapping between the low DR (SDR) and the extended DR (VDR) and a high precision (e.g., 14-bit bit depth) version of the SDR content. From the intermediate output of SDR filtering and mapping analysis 311, the encoder module 312 generates an output for export, which includes a compatible advanced video codec (AVC) bitstream (e.g., substantially compatible with MPEG-4/H.264/AVC) and meta data that relate to the mappings and/or the modifications performed over the SDR filtering and mapping analysis 311 and the encoder module 312.

Decoder 320 includes decoder module 321 and a mapping and conversion module 322. Decoder module 321 receives an input that includes a compatible AVC bitstream and meta data that relate to the mappings and/or the modifications that were performed over the content of the AVC compatible bitstream with an SDR to VDR encoder (e.g., encoder 310). Decoder module 321 decodes the AVC compatible bitstream content and, with the meta data input thereto, provides an intermediate output to mapping and conversion module 322.

The intermediate output includes a mapping between the SDR content and the VDR content and a high precision (e.g., 14-bit bit depth) version of the SDR content. Mapping and conversion module 322 processes the intermediate output and generates a VDR content version that has high precision color space information in an additional or alternative color space, such as 'LogLuv' (LogLu'v') or other high precision color space that may be associated with VDR or HDR content.

Example Filtering and Mapping Flow

Layered BL/EL architectures typically aim to encode both SDR content and VDR content with essentially absolute fidelity, which has a significant associated bit cost. In contrast, an embodiment of the present invention effectively forgoes an absolute fidelity in a sense. However, an embodiment achieves fidelities that are perceptually adequate on state of the art and immediately foreseeable VDR/HDR capable displays. For example, if a (e.g., hypothetical) light feature in an image or video frame has an absolute intensity (e.g., brightness, luminance, luma, luminosity) of 1200 Candelas per square meter ($Cd/m^2$ or 'nits') an embodiment may render the light feature on a VDR/HDR display at 1100 nits. To normal viewers, the light feature will still appear as a very bright light and the impact of the HDR capability of the display is preserved. An embodiment thus balances a permissibility of a certain degree of modification to the high-precision SDR image and allows some kinds of imperfections in the VDR, e.g., from inverse mapping, which effectively achieves a global mapping between the two.

Figure 4:
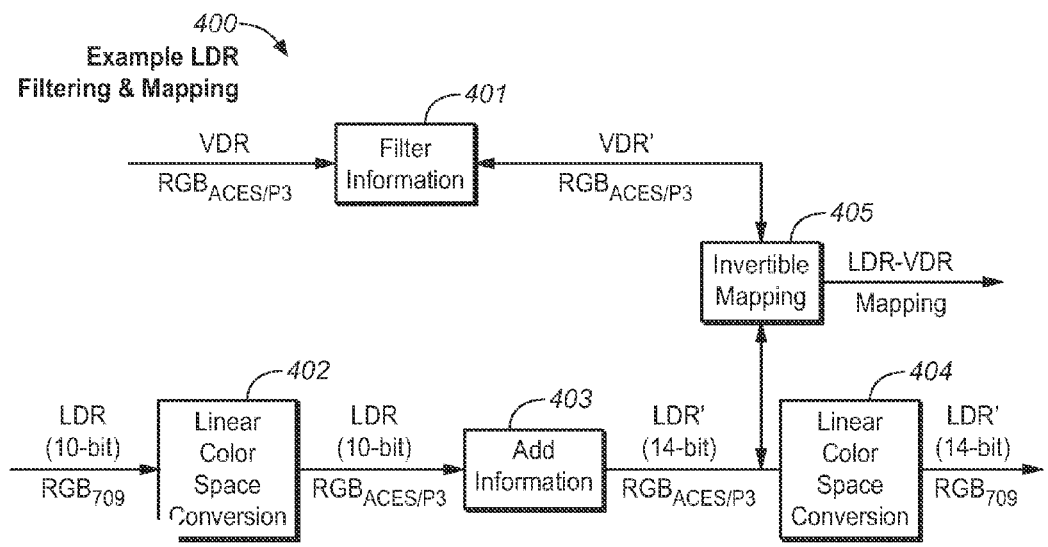
FIG. 4 depicts an example SDR filtering and mapping flow, according to an embodiment of the present invention.

FIG. 4 depicts an example SDR filtering and mapping flow 400, according to an embodiment of the present invention. Filter information module 401 receives a VDR input, which has relatively high (e.g., in relation to a color gamut associated with SDR) precision RGB information in a wide gamut (e.g., ACES, P3) color space encoded therewith. Filter information module 401 removes information in relation to filtering processes performed on its VDR/high precision RGB input and provides high precision VDR'/RGB information to invertible mapping module 405.

Linear color space conversion module 402 receives an SDR (e.g., 10-bit) input, which has relatively low (e.g., in relation to a color gamut associated with VDR) precision RGB information represented in a standard gamut (e.g., ITU BT.709) color space encoded therewith. Linear color space conversion module 402 processes the SDR and converts the standard gamut RGB color components thereof to a relatively wide gamut RGB color space, such as the ACES or P3 color spaces. The output of linear color space conversion module 402 provides an input to an information addition module 403.

Information addition module 403 processes its SDR input and adds additional (e.g., tone related) information thereto and outputs a high precision (e.g., 14-bit) SDR' in the wide gamut RGB color space.

Invertible mapping module 405 processes inputs from filter information module 401 and information addition module 403 and generates a mapping, from the SDR content version to the VDR content version. Invertible mapping module 405 outputs the generated SDR-to-VDR mapping. The high precision (e.g., 14-bit) SDR' in the wide gamut RGB color space is provided to linear color space conversion module 404. Linear color space conversion module 404 converts the high precision SDR'/wide gamut RGB color space output of information addition module 403 to high precision SDR' with a standard color gamut (e.g., ITU BT.709). Upon performing the conversion, linear color space conversion module 404 outputs the high precision SDR' with a standard color gamut (e.g., ITU BT.709) as a component of an AVC compatible bitstream. When decoded, the output SDR-to-VDR mapping generated with invertible mapping module 405 may map a conversion from the SDR content version to the VDR content version, which allows either (or both) content versions to be displayed. The mapping generated with invertible mapping module 405 is invertible.

Figure 5A:
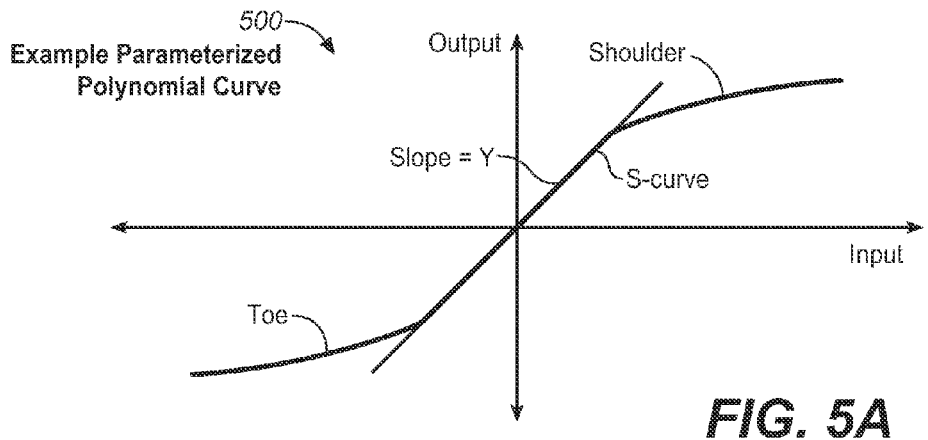
FIG. 5A depicts an example computed parameterized polynomial curve, according to an embodiment of the present invention.
Figure 5B:
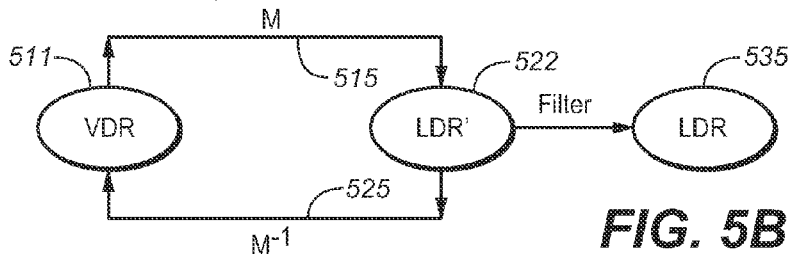
FIG. 5B example invertible mappings, according to an embodiment of the present invention.

FIG. 5B depicts example invertible mappings, according to an embodiment of the present invention. The invertible mappings represent the mappings that may be generated with invertible mapping module 405. VDR content version 511 maps to high precision SDR' content version 522. The mapping may comprise a TMO 515. With an inverse mapping operation 525, high precision SDR' content version 522 maps to VDR content version 511. The inverse mapping may comprise an iTMO 525, which may be complimentary, supplementary or otherwise in an inverted correspondence with TMO 515. The high precision SDR' 522 may be filtered into (e.g., generate, produce) low precision (e.g., 8 bit) SDR 535.

Thus, an embodiment functions with high-precision SDR content versions as though they are more than "simply" a high-precision version of the input SDR. Instead, the high-precision SDR content version may be viewed or perceived in a similar way as the input low-precision SDR, when decoded at low-precision. Moreover, an embodiment encodes a VDR content version that comprises other than the input VDR to filter information module 401. Instead, an embodiment encodes a VDR content version that simultaneously retains the "look" (e.g., appearance, tone, texture) of the VDR that is input to filter information module 401, but which maintains a strictly invertible relationship with the high precision SDR'. In this sense therefore, the VDR' generated with filter information module 401 at least closely approximates the VDR content input to module 401. The high precision SDR' content that is generated with information addition module 403 is, in a sense, a higher quality SDR content version than the SDR content that is input to linear color space converter 401 because the high precision SDR' content contains information that was, in a sense, removed unnecessarily during the original creation of the input 10-bit SDR.

An embodiment thus reduces dynamic range with a non-linear mapping and, essentially emulating film, separately maps the individual R, G and B color components (e.g., or two of the three color components). Where the mapping may result in saturation and/or hue rotation, an embodiment scales the mapping and/or scales (e.g., by a factor of approximately 15%) an intensity related saturation preserving mapping. This feature is consistent with the approach taken in the AMPAS Image Interchange Framework (IIF) reference rendering transform (RRT). An embodiment thus emulates physical DR reduction, analogous to the function of film, cameras, the cones of human eyes and/or somewhat more general color correction approaches. An additional or alternative embodiment may similarly function with a linear, linearized, substantially linear, or approximately linear mapping.

An embodiment imposes a non-linear transfer function, such as a parameterized polynomial curve (e.g., S-curve) over the R G B color components. FIG. 5A depicts an example computed parameterized polynomial curve 500, according to an embodiment of the present invention. The body of curve 500 is substantially linear with an approximately constant slope $\gamma$ (gamma) in a logarithmic-logarithmic plot (e.g., base 10) with output on the vertical axis and the input on the horizontal axis. The toe of curve 500 corresponds to relatively low values, such as shadows or dark spaces. The shoulder of curve 500 corresponds to relatively high values, such as lights and highlights. An embodiment may apply saturation correction, such as with an intensity-related scaling factor, to deter shifting color space axes that may relate to one or more of saturation, hue, and/or tint. An additional or alternative embodiment may similarly function with a linear, linearized, substantially linear, or approximately linear transfer function.

A lower bound on mapping complexity in an embodiment is constrained by a product of a non-linear primary color correction approximation or transformation NLx and a matrix based secondary color correction approximation or transformation Mtx. An embodiment may use a somewhat more general 'MNM' mapping that corresponds to a product of a first matrix based secondary color correction approximation or transformation Mtx, the non-linear primary color correction approximation or transformation NLx, and a second matrix based secondary color correction approximation or transformation Mtx', wherein MNM=Mtx° NLx° Mtx'. An additional or alternative embodiment may similarly function with a linear, linearized, substantially linear, or approximately linear primary color correction approximation or transformation.

An embodiment essentially functions according to a perceptual metric that is normalized to an adaptation level, which is consistent with the basic notion of simultaneously perceivable VDR. For example, a signal-to-noise ratio (SNR) perceptual metric may be used, along with or as an alternative to a peak signal-to-noise ratio (PSNR) perceptual metric. An embodiment distinguishes between that which is actually (e.g., barely) visible such as a computed just noticeable difference (JND) from what is noticeable or objectionable. To a first order, errors that appear in bright image or frame regions seem to be more noticeable than errors that appear in dimmer image or frame regions. An embodiment may use one or more, or all of three metrics during encoding: a PSNR relative to a restricted DR (e.g., 2×104), a self-normalizing SNR, and/or a Structural SIMilarity Index (SSIM) based measurement such as tone mapping SSIM (TM-SSIM).

SSIM, in contrast to PSNR approaches (which only measures the mean square difference between the two signals), includes three separate components: (1) intensity comparison, (2) contrast comparison, and (3) structure comparison. The three separate components account well for visual differences in HDR/VDR signals. Moreover computing SSIM, while perhaps somewhat more complex than PSNR approaches, achieves efficiencies that exceed HVS-based metrics such as the visual difference predictor (VDP) or JND.

An embodiment encodes VDR' content that may differ in an aspect from the input VDR, but which retains the "look" of the input VDR as it simultaneously maintains an invertible relationship with the high precision/WCG SDR content. Thus VDR' is "close to" VDR in the sense of the previous example. Furthermore, SDR' is, in some sense, a "better" SDR version, at least in the sense that it carries information that was unnecessarily removed during the original creation of the input 10-bit SDR.

Figure 5C:
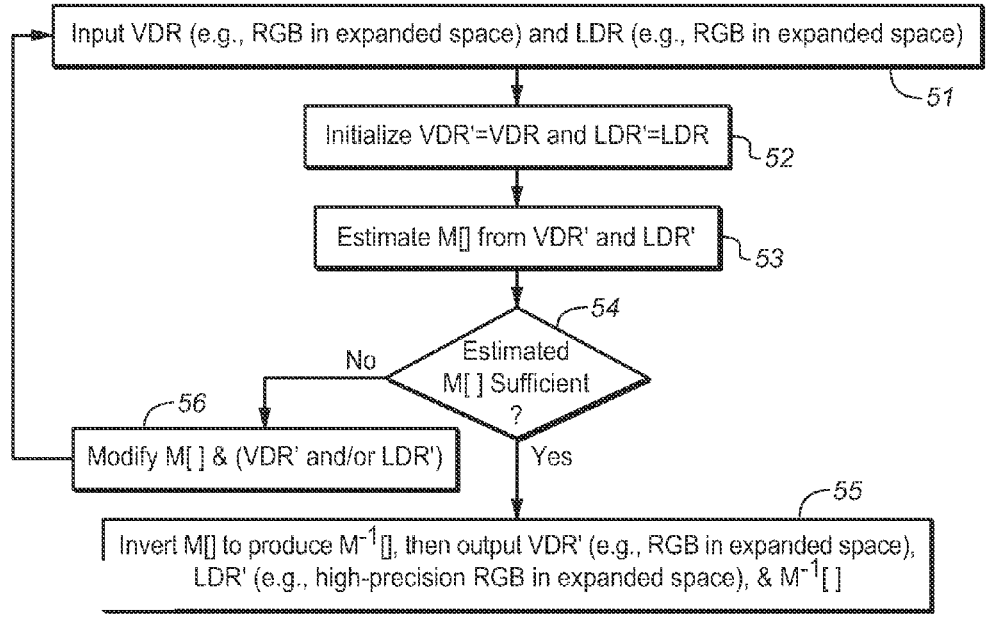
FIG. 5C depicts a flowchart for an example process, according to an embodiment of the present invention.

FIG. 5C depicts a flowchart of an example process 50, according to an embodiment of the present invention. Process 50 synthesizes high-precision SDR' that is normalized in relation to modified VDR content. In step 51, VDR (e.g., RGB in an expanded color space such as ACES or P3) and SDR (e.g., RGB in an expanded color space that was converted from its original BT-709 color space) is input. In step 52, VDR' is equated with VDR and SDR' is equated with SDR. In step 53, the invertible mappings M[ ] are estimated. In step 54, it is determined whether the estimated invertible mappings M[ ] are sufficient. If so, then in step 55, the VDR' (e.g., RGB in the expanded color space), SDR' (e.g., high-precision RGB in the expanded color space), and the estimated invertible mappings M[ ] are output. If not, then in step 56, one or more of the estimated invertible mappings M[ ], the VDR' and/or the SDR' are modified. Upon modifying the estimated invertible mappings M[ ], the VDR' and/or the SDR', process 50 recursively goes to step 51 and repeats.

Figure 6:
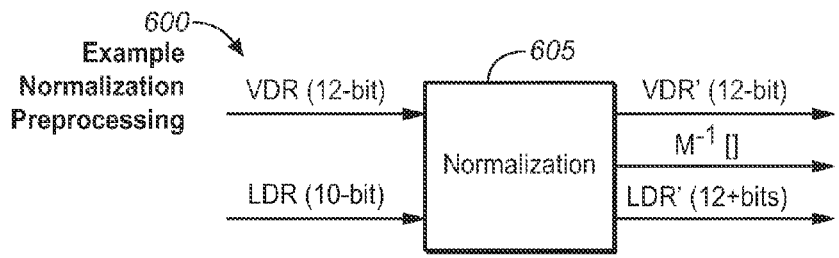
FIG. 6 depicts example normalization processing, according to an embodiment of the present invention.

FIG. 6 depicts example normalization processing 600, according to an embodiment of the present invention. A normalization module 605 receives a 10-bit low precision SDR input and a 12-bit VDR input. Normalization module 605 outputs a 12-bit VDR', which is mapped to a high precision 12-plus-bit SDR' version with an invertible mapping M[ ]. In an embodiment, normalization comprises a pre-processing technique for the input VDR, which performs one or more of at least three functions. First, normalization provides invertible mapping. In an embodiment, invertible tone mapping may conform substantially to a parameterized polynomial curve, such as S-shaped polynomial curves 712 and 722 (e.g., and/or 500; FIG. 5). In an embodiment, invertible tone maps may conform to one or more of a set of multiple parameterized polynomial curves.

Figure 7A:
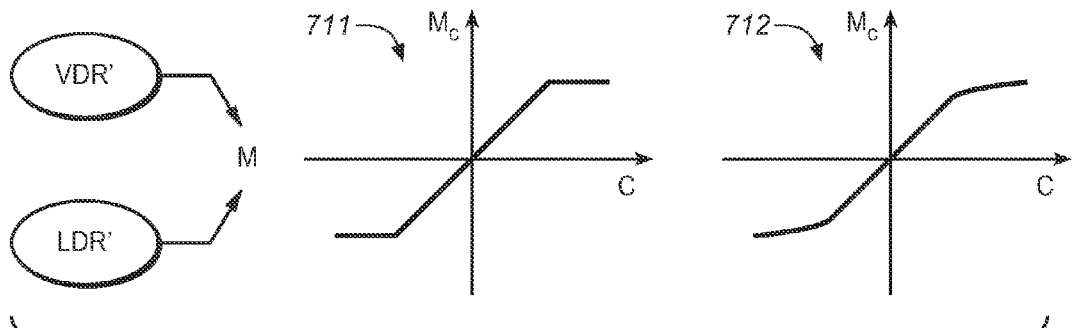
FIG. 7A and FIG. 7B depict examples of normalization, according to an embodiment of the present invention.

FIG. 7A depicts an example of mapping inversion in which clipping, which was performed in a forward mapping, may be undone according to an embodiment of the present invention. Tone mapping 711 is depicted with mapping predictors M[ ] which provide hard clipping of a VDR signal. In FIG. 7A (and e.g., FIG. 7B), the horizontal axis represents VDR values and the vertical axis represents SDR values. Forward mapping M[ ] operates on the VDR such that SDR'=M[VDR]. Tone mapping 712 is depicted with soft clipping of a VDR signal. Soft clipping may add information to the high precision SDR', which in a sense renders the SDR' signal similar in a way that makes it somewhat similar to a corresponding VDR version and thus represents an improvement. However, while the resulting SDR' signal has a high precision bit depth (e.g., 14 bits), the SDR' signal may show but little perceivable improvement over the SDR content that has a lower precision bit depth (e.g., 8 bits).

Figure 7B:
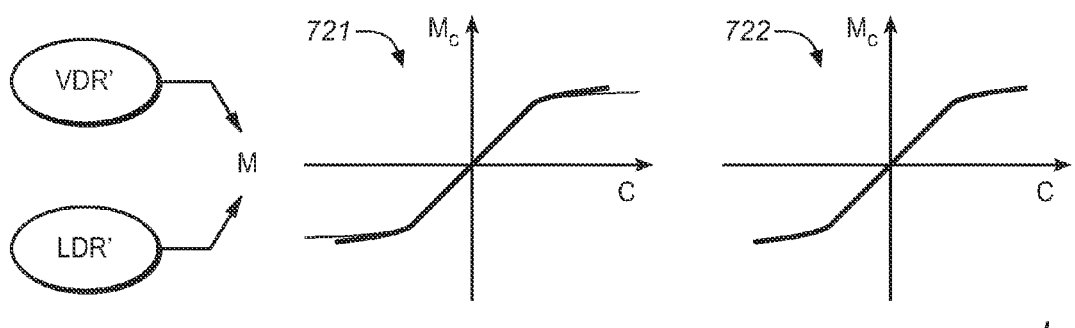

Second, normalization conforms an SDR content version and a VDR content version to a global mapping, which effectively removes local variations. FIG. 7B depicts an example of global tone mapping 720, according to an embodiment of the present invention. An embodiment selects one or more of a set of multiple tone maps. Tone maps 721 show multiple tone maps, one each for different regions illustrating local tone mapping. In an embodiment, the selection is based on which of the invertible tone maps leads to the least modification, e.g., between the SDR and SDR' versions, or between the VDR' and the VDR versions. Upon selection of the most conformational invertible tone map, the SDR' and/or the VDR' content versions may be altered according thereto. A single tone map 722 may be selected to account for local spatial variations.

Third, normalization handles quantization of the low-precision SDR input signal. In an embodiment, the VDR content version and the SDR content version comprise a normalized pair. The invertibility of an embodiment's normalized pairings and/or mappings substantially conform to specifications such as the IIF, which relate to the AMPAS pipeline. In an embodiment, a VDR' content version and a high precision SDR' content version are normalized with a matrix mapping and with a non-linear mapping. An additional or alternative embodiment may similarly function with a linear, linearized, substantially linear, or approximately linear mapping.

Figure 8A:
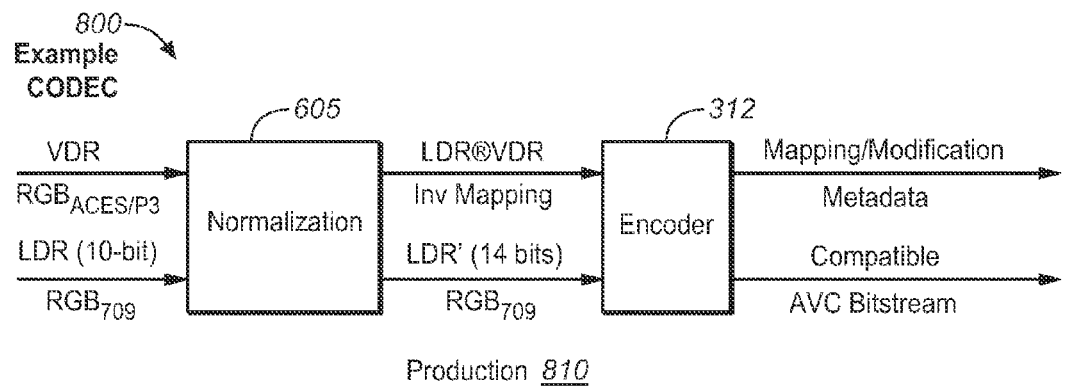
FIG. 8A and FIG. 8B depict an example codec, according to an embodiment of the present invention.
Figure 8B:
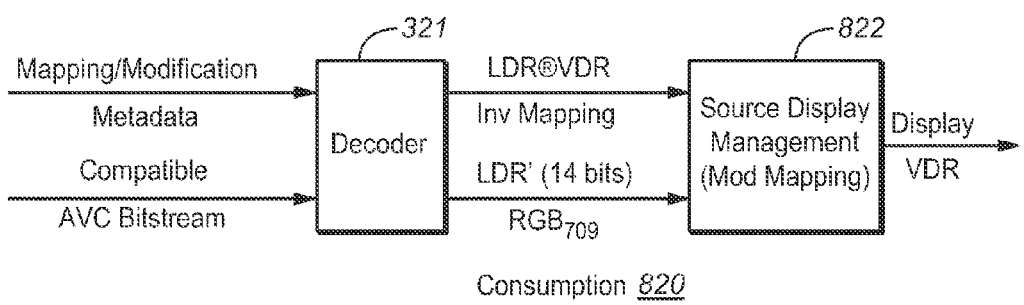

FIG. 8A and FIG. 8B depict an example codec 800, according to an embodiment of the present invention. In a production mode 810, the codec comprises normalization module 605 and encoder 312. Normalization module 605 processes a VDR content version, which has an ACES or P3 RGB color space, and a 10-bit SDR content version, which has a BT-709 RGB color space. Upon processing these inputs, normalization module 605 provides a 14-bit SDR' content version, which has a BT-709 RGB color space, and information that relates to the invertible SDR-to-VDR mapping to encoder 312. Encoder 312 processes 14-bit SDR' content version, with the BT-709 RGB color space, and the information that relates to the invertible SDR-to-VDR mapping and produces an AVC compatible bitstream output, along with information such as meta data, which relate to the mappings and modifications on the SDR and VDR content versions.

In a consumption mode 820, the codec comprises decoder 321 and source display management module 822. Decoder 321 receives an AVC compatible bitstream input, along with information such as meta data, which relate to the mappings and modifications on the SDR and VDR performed, e.g., in production mode 810. Decoder 321 processes the input signal and provides a 14-bit SDR' content version, which has a BT-709 RGB color space, and information that relates to the invertible SDR-to-VDR mapping to source display management module 822. Source display management module 822 processes the 14-bit SDR' content version, with the BT-709 RGB color space, and the information that relates to the invertible SDR-to-VDR mapping and produces an output signal that comprises VDR content with modification mapping related information for a display.

FIG. 9A and FIG. 9B depict example signal flows 900, according to an embodiment of the present invention. FIG. 9A depicts an example media mode signal flow 910, according to an embodiment. Normalization module 605 processes a VDR content version and a low-bit SDR content version. Upon processing these inputs, normalization module 605 provides a high precision SDR' content version, and information that relates to the invertible SDR-to-VDR mapping to encoder 312. Encoder 312 processes the high precision SDR' content version and the information that relates to the invertible SDR-to-VDR mapping and produces an AVC compatible bitstream output (e.g., along with information such as meta data, which relate to the mappings and modifications on the SDR and VDR content versions).

In example media mode signal flow 910, the AVC compatible bitstream is provided to an AVC compliant decoder, such as an H.264/AVC MPEG-4 decoder 915, which processes the bitstream and outputs a typically lower precision SDR content version. Further, in example media mode signal flow 910, the AVC compatible bitstream is provided to decoder 321, which processes the bitstream and outputs a high precision SDR' content version and a set of mappings between the SDR' content version and the VDR content version to source display management module 935. Source display management module 935 outputs a display compatible VDR content version, which may be rendered with a VDR capable display.

FIG. 9B depicts an example real-time (e.g., broadcast) mode signal flow 920, according to an embodiment. An input signal to a color management module (e.g., color correction tools) 925. Color management module 925 processes the VDR input. Upon processing the VDR input, color management module 925 provides a high precision SDR'content version, and information that relates to the invertible SDR-to-VDR mapping to encoder 312. Encoder 312 processes the high precision SDR' content version and the information that relates to the invertible SDR-to-VDR mapping and produces an AVC compatible bitstream output (e.g., along with information such as meta data, which relate to the mappings and modifications on the SDR and VDR content versions). In example real-time/broadcast mode signal flow 920, the AVC compatible bitstream is provided to an AVC compliant decoder, such as an H.264/AVC MPEG-4 decoder 915, which processes the bitstream and outputs a typically lower precision SDR content version. Further, an embodiment decodes broadcast media flow 920 in substantially the same way as media mode signal flow 910 was decoded. In an embodiment, the decoding process for media mode signal flow 910 and real-time broadcast flow 920 may be identical. An AVC compatible bitstream is provided to decoder 321, which processes the bitstream and outputs a high precision SDR' content version and a set of mappings between the SDR' content version and the VDR content version to source display management module 935. Source display management module 935 outputs a display compatible VDR content version, which may be rendered with a VDR capable display.

FIG. 10 depicts a matched encoder/decoder pair 1000, according to an embodiment of the present invention. In an embodiment, encoder 312 receives an input signal that comprises high precision SDR' content for both high precision encoding module 1011 and AVC compatible (e.g., 8-bit; a bit depth that may in a sense be considered somewhat low precision, in relation to the high precision SDR' content) encoding module 1012. High precision encoding module 1011 encodes the high precision SDR' content and provides a high precision bitstream to a critical difference determination module 1013. Compatible encoding module 1012 provides the AVC compatible (e.g., 8-bit; relatively low precision) encoded bitstream for export to decoder 321 and input to critical difference determination module 1013.

Critical difference determination module 1013 compares the high precision encoded bitstream from the high precision encoding module 1011 and the AVC compatible (e.g., 8-bit) encoded bitstream from the AVC compatible (e.g., 8-bit) encoding module 1012. Upon comparing the high precision encoded bitstream and the AVC compatible (e.g., 8-bit; relatively low precision) encoded bitstream, the critical difference determination module 1013 provides information, such as meta data which relate to the differences between the high precision encoded bitstream and the compatible (e.g., 8-bit; relatively low precision) encoded bitstream to the decoder 321.

In an embodiment, decoder 321 receives the AVC compatible (e.g., 8-bit) encoded bitstream from encoder 312, along with the information (e.g., meta data) which relates to the differences between the high precision bitstream, which was encoded with the high precision encoding module 1011, and the compatible (e.g., 8-bit; relatively low precision) encoded bitstream. An information (e.g., meta data) merge module 1024 uses the information that relates to the differences between the high precision bitstream to effectively recover (e.g., reconstruct, reconfigure, reconstitute, regenerate, reproduce) a bitstream that comprises essentially the same information as the high precision bitstream. From the recovered high precision bitstream, a high precision decoding module 1025 generates a high precision SDR' output. For example, the output of decoder 321 may have a precision of at least greater than or equal to a 4:2:0 (intensity and color component) sampling pattern or sampling configuration and a bit depth that at least exceeds 8-bits. For example, embodiments function wherein the intensity/color sampling pattern/configuration of decoder 321 output has a precision of 4:2:0, 4:2:2 or 4:4:4 and/or a bit depth of 10-14 bits.

An embodiment may function with a scalable bit depth. For example, the bit depth may be implemented as scalable between 8-bits and 12-bits plus (e.g., 12-14-bits). Thus, an embodiment may leverage one or more established scalable video coding (SVC) or related technological approaches. In a sense therefore, an embodiment may tend to function as "codec agnostic," e.g., functioning effectively with a variety of SVC and related or similar scalable approaches. As used herein the term "leverage" may relate to the use of such approaches.

Moreover, as encoder 312 outputs a compatible 8-bit-stream plus meta data, derivation of the compatible bitstream from higher precision input essentially reduces the overhead of coding 8-bit quantization noise, which may be particularly helpful with encoding smooth gradients. Further, as decoder 321 merges the meta data with the compatible 8-bit coded bitstream, it essentially recovers, internally, a high precision bitstream, which is acceptably close to the high-precision bitstream output of the encoder 1011. An embodiment decodes the high-precision bitstream to yield high precision SDR'. An embodiment maps the SDR', using the invertible mapping $M^{-1}[\ ]$, to produce a VDR output, which may be rendered with VDR capable displays.

Figure 11:
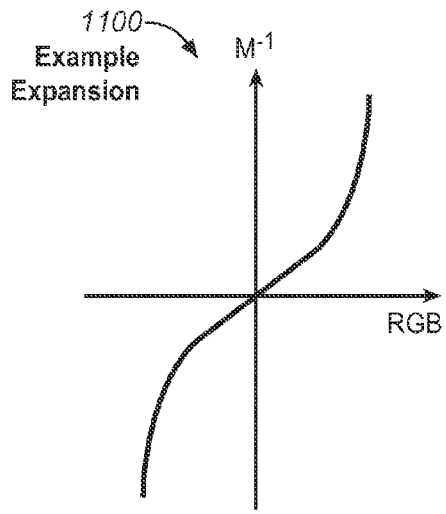
FIG. 11 depicts an example expansion, according to an embodiment of the present invention.

To control the high precision encoding module 1011 and/or other components or high precision SDR' encoder functions of encoder 312, an embodiment assesses quality (e.g., with a TM-SSIM or related approach, as described above) in the inverse mapped VDR space, although related signals may or may not be. An embodiment increases computed precision and/or accuracy in image or video frame regions that are to be expanded in relation to their associated dynamic range. For example, the inverse mapping may extend the precision/accuracy. FIG. 11 depicts an example expansion 1100, according to an embodiment of the present invention.

Figure 12:
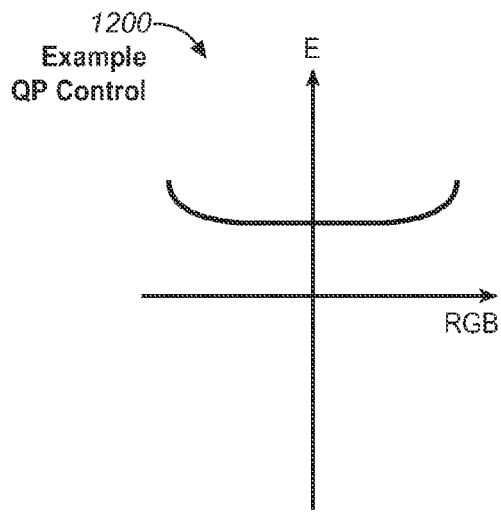
FIG. 12 depicts an example QP control, according to an embodiment of the present invention.

An embodiment controls quantization parameters (QP). For example, QPs may be diminished in value in relation to image or video frame regions that will undergo dynamic range expansion. This reduces a bitstream overhead that may be associated with VDR, because of what may amount to significant QP reductions in DR expanded regions, and a somewhat lower overall QP from general quality improvements. FIG. 12 depicts an example QP control 1200, according to an embodiment of the present invention. An embodiment computes an expansion parameter as equal to the gradient or divergence of the inverse mapping estimate: $E=|\nabla M^{-1}[\ ]|$. In an embodiment, the quantization parameter is proportional to the reciprocal of the expansion: $QP \propto 1/<E>$.

Figure 13:
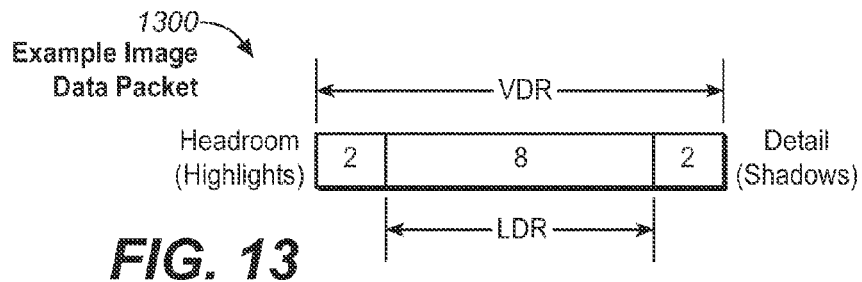
FIG. 13 depicts an example image data packet, according to an embodiment of the present invention.

An embodiment may also exert control with a 10-bit coding depth, which slides back and forth along a 14-bit depth. FIG. 13 depicts an example image data packet 1300, according to an embodiment of the present invention. An 8-bit SDR section "slides between" 2-bits that relate to headroom such as image highlights, and 2-bits that relate to detail such as shadows.

An embodiment integrates with display management. For example, the transformation used in source display management matches the inverse mapping between SDR and VDR inside the codec of an embodiment, in which the inverse mapping of the SDR essentially comprises full VDR. The source display management transformation thus conforms SDR to high precision SDR and full VDR. Dual-ended display management may thus be simplified.

Figure 14:
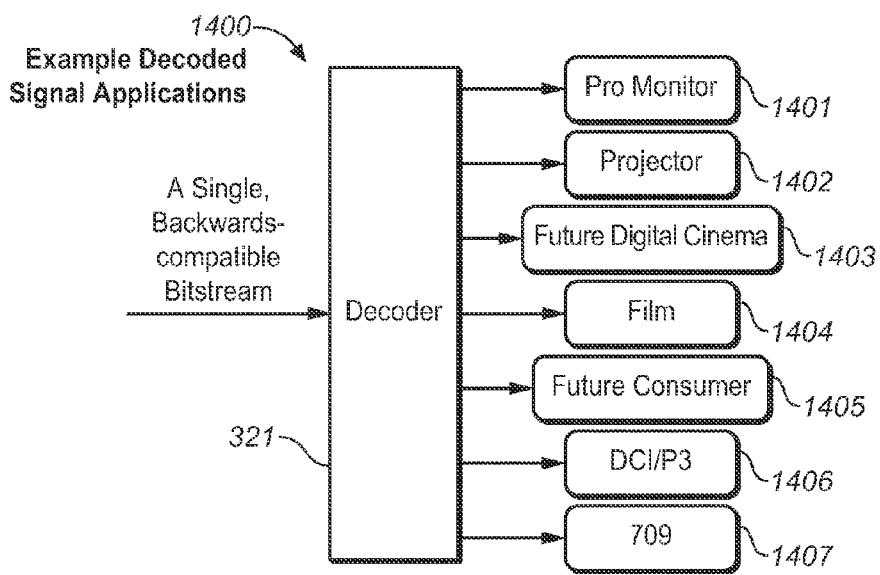
FIG. 14 depicts example decoded signal applications, according to an embodiment of the present invention.

An output of decoder 321 may be used as once-mastered digital image or video content for any of a number of applications. FIG. 14 depicts multiple decoded signal applications 1400, according to an embodiment of the present invention. For example, applications 1400 that may use the output of decoder 321 may include one or more of a professional monitor application 1401 such as the Dolby Labs ProMonitor™, digital projector 1402, present and future digital cinema 1403, film transfer 1404, present and future consumer electronics and home media applications 1405, applications relating to the Digital Cinema Initiative (DCI) and the related P3 color space 1406, and BT-709 color space 1407 related applications.

FIG. 15 depicts example color gamut 1500, according to an embodiment of the present invention. Color gamut 1500 has a spectrum locus 1501. Within spectrum locus 1501 are gamut 1502, which relates to the BT-709 color space, gamut 1503, which relates to the DCI P3 color space, and gamut 1504, which relates to the P4 color space.

Section II

Assessing Image Quality Over Extended Dynamic Ranges or Wide Color Gamuts

Embodiments of the present invention relate to assessing image quality over extended dynamic ranges and/or wide color gamuts. Embodiments of the present invention may be implemented with a variety of procedures, methods and systems. The description herein at Section I above describes an example of a process for enhancing image dynamic range. Section I above thus represents a discussion that provides context in relation to embodiments of the present invention and describes example systems with which embodiments of the present invention may be practiced, e.g., assessing image quality over extended dynamic ranges and/or wide color gamuts. An example embodiment assesses image quality over extended dynamic ranges and/or wide color gamuts of VDR, HDR, SDR' and/or WCG images and video frames that are produced using the example approaches, techniques and processes described in Section I above. It should be understood and apparent to artisans skilled in fields related to the image, video, color science, photographic and similar arts however that the description in Section I is provided merely by way of example and to provide context in which to describe an example embodiment, and is expressly not to be construed or confused as representing a limitation to embodiments in any sense. On the contrary, artisans skilled in the relevant fields should recognize that an embodiment of the present invention is well suited to assess image quality over extended dynamic ranges and/or wide color gamuts for VDR, HDR, SDR' and/or WCG images and video frames that may be produced using any of a variety of other approaches, techniques and/or processes.

In an example embodiment, a first video signal is accessed, which is represented in a first color space with a first color gamut that is related to a first dynamic range. A second video signal is accessed, which is represented in a second color space of a second color gamut. The second color space is associated with a second dynamic range. The first accessed video signal is converted to a video signal that is represented in the second color space of the second color gamut with the second dynamic range. At least two color-related components of the converted video signal are mapped over the second dynamic range. The mapped first accessed video signal and the second accessed video signal are processed. Based at least in part on the processing of the mapped first accessed video signal and the second accessed video signal, a difference is measured, which may exist between the processed first and second video signals. A visual quality characteristic relates to a magnitude of the measured difference between the processed first and second video signals. The visual quality characteristic is assessed based, at least in part, on the measurement of the difference, which may be measured to exist between the processed first and second video signals.

Example embodiments described herein relate to quality assessment of high dynamic range, visual dynamic range, and wide color gamut image and video. Assessing a visual quality characteristic includes accessing and processing at least a first image or video signal and a second image or video signal. Based at least in part on processing the accessed images or video signals, a difference is measured between the processed at least first and second images or video signals. The visual quality characteristic relates to a magnitude of the measured difference between the processed at least first and second images or video signals. The at least first and second images or video signals include a dynamic range and/or a color gamut. The visual quality characteristic is assessed based, at least in part, on the measured difference. The dynamic range includes a visual dynamic range (VDR) and/or a high dynamic range (HDR) and the color gamut comprises at least one of an extended color gamut or a wide color gamut (WCG).

It should be appreciated that the techniques described herein, while described in relation to at least a first and a second image or video signal, may be applied over more than two images or video signals. While descriptions herein may refer to images or to video signals or to both, it should also be appreciated a reference to either term is meant to describe both terms (unless a particular description or portion thereof expressly states to the contrary in that particular case).

An embodiment reports the measured difference between the processed at least first and second images or video signals, such as with an output of a visual quality assessment based on the measured difference between the processed first and second images or video signals. The reported measured difference between the processed first and second images or video signals may include numerical data that is related to the measured difference between the processed first and second images or video signals and/or a map that represents the measured difference between the processed first and second images or video signals. The difference map represents the measured difference between the processed at least first and second images or video signals in a graphical format. The graphically formatted map represents the measured difference between the processed at least first and second images in one or more of a correspondence to or a registration with the at least first and second images. An embodiment marks the measured differences between the processed first and second images or video signals. Thus, the difference map represents the marked measured differences in a spatial conformation with the first and second images or video signals.

In an embodiment, at least one of the first and second images or video signals comprises a target image, for which the visual quality characteristic is assessed. Thus, at least a second of the images or video signals comprises a reference image. The visual quality characteristic is assessed for the target image with a comparison to the reference image.

In an embodiment, processing the accessed images or video signals includes computing one or more components of the at least first and second images or video signals according to a plurality of related parameterized functions. In an embodiment, computing the components of the first and second images or video signals according to a plurality of related parameterized functions includes computing a photographic mapping. Components of the first and second images or video signals relate to a brightness characteristic (e.g., intensity, luminance, luma) or a color characteristic (e.g., chrominance, chroma) of the first and second images or video signals.

The dynamic range and/or the color gamut of an embodiment respectively comprise a first dynamic range or a first color gamut. Processing the accessed images or video signals includes transforming a color space associated with the at least first and second images or video signals. The color space may be transformed from a first dynamic range to at least a second dynamic range. Additionally or alternatively, the color space may be transformed from a first color gamut to at least a second color gamut.

Transforming the color space may include converting multiple first non-linear values that are associated with the first dynamic range and/or the first color gamut to multiple second values that have essentially linear characteristics. The second values are scaled according to a non-linear scaling factor, which corresponds to a perceptual non-uniformity that may be associated with the conversion from non-linear values to essentially linear values. The first non-linear values may be associated with a gamma encoded RGB signal. Thus, converting to the essentially linear values may include an undoing or reversing the gamma encoding associated with the RGB signal. Non-linear scaling may be applied over the brightness related component and/or the color characteristic of the first and second images or video signals. Upon scaling the brightness related component and/or the color characteristic, the difference between the first and second images may be measured according to the scaled brightness related component and/or the scaled color characteristic. The essentially linearized RGB signal may comprise an XYZ color space. An embodiment may convert the XYZ color space into a scaled RGB color space and encode the scaled RGB color space with a gamma value. The difference between the first and second images or video signals may be measured according to the gamma encoded scaled RGB color space. An additional or alternative embodiment may similarly function with a linear, linearized, substantially linear, or approximately linear values.

In an embodiment, measuring the difference between the processed first and second images or video signals includes measuring a structural similarity index (SSIM) value between them. Measuring the structural similarity index value may include comparing a value that relates to an image intensity (e.g., brightness), a contrast and a structure. The intensity, contrast and structure are associated with the first and second images or video signals.

The first and second video signals may include multiple frames, slices, and/or fields. An embodiment measures the difference for each of the frames, slices and/or fields as an individual difference, further processes the measured individual differences, and generates an overall difference value for the video sequence that comprises the plurality of frames, slices or fields.

An embodiment may execute, perform, or implement these techniques with a variety of systems, video quality assessment apparatus, integrated circuits (IC), including microprocessors, digital signal processors (DSP), configurable or programmable logic devices such as gate arrays (e.g., FPGA) and microcontrollers, and application specific ICs (ASIC).

Example Image and Video Quality Assessment

Assessing attributes that relate to the visual quality of an image or video signals can be significant in image and video applications that may include, but are not limited to capturing, compression, delivery and display of the images or video signals. Quality assessment can be used to benchmark, monitor, adjust and/or optimize a 'quality attribute' (e.g., a characteristic that relates to a subjective or objective perception or measurement of one or more aspects of visual or pictorial excellence, worthiness, accuracy, precision or value) of images and video signals.

In general, image and video quality assessment methodology falls into at least one of subjective or objective assessments of quality. To achieve a subjective quality assessment, a typically large number of human observers visually assess target images and displayed video signals in a controlled environment. Upon assessing the target image or displayed video signals, the human observers are polled as to their decisions, opinions or inclinations relating to the perceptual quality of the observed image and video signals, as perceived by each subject observer. The observers' decisions are then typically further processed to form a Mean Opinion Score (MOS).

The assessment opinions established by subjective quality assessment are generally considered as a significant "ground truth" indicator. However, subjective quality assessment typically demands a significant investment of time and expense to complete. Moreover, subjective quality assessments may sometimes be essentially impractical for some applications. Applications for which subjective quality assessments may sometimes be essentially impractical may include, but are not limited to image and video process (e.g., algorithm) optimizations, which may benefit, at least in part, from real-time assessment feedback.

In situations for which real-time assessment feedback may be beneficial, objective quality assessments may be a more appropriate approach than subjective assessment. Objective quality assessment evaluates the target image or video signal and forms (e.g., measures, generates, outputs or promulgates) a visual quality related analysis or report in relation to the visual quality of the image or signal. Objective quality assessments typically strive to achieve assessment values or scores that match or approximate as closely as possible to reliable or dependable corresponding subjective quality assessments.

Objective quality assessments may be classified as at least one of three classes: (1) full-reference, (2) reduced-reference, or (3) no-reference objective quality assessments. Full-reference (FR) assessments use a complete reference image, which is assumed available for comparison with target images. Reduced-reference (RR) quality assessments are made with partially available the reference images, such as in the form of extracted features (e.g., "media fingerprints," other hash-related signatures, or metadata. No-reference (NR) quality assessments are made where no reference image is known or available. NR and RR objective quality assessments are typically difficult to efficiently, quickly and economically achieve. An embodiment of the present invention relates to full-reference (FR) image quality assessment.

FR objective quality assessment (OQA) may be made according to one or more optional techniques. Peak Signal-to-Noise Ratio (PSNR) may be used to achieve a FR OQA. PSNR may be derived from the Mean Squared Error (MSE). Given two vectors of length N $x=\{x_i | i=1, \ldots, N\}$ and $y=|\{y_i | i=1, \ldots, N\}$, the MSE between x and y and the PSNR may respectively be computed according to Equations 1A and 1B, below.

$$MSE(x, y) = \frac{1}{N} \sum_{i=1}^{N} (x_i - y_i)^2 \tag{1A}$$

$$PSNR(x, y) = 10 \log_{10}\left(\frac{L^2}{MSE(x, y)}\right) \tag{1B}$$

In Equation 1B, L represents a maximum possible pixel value of the image (for example, for the 8-bit SDR image and video signals between [0, 255], L=255).

MSE and/or PSNR are relatively simple computations. The simplicity of the MSE and PSNR computations are widely used in signal processing, including image and video applications. Moreover, the MSE and PSNR computations may benefit from quadratic representation, which can provide closed-form optimization solutions. However, MSE or PSNR may not always correlate strongly with MOS. An embodiment of the present invention provides a quality assessment that may more reliably correlate with MOS, or otherwise improve reliability over the MSE and PSNR approach.

An embodiment of the present invention emulates the human visual system (HVS) to provide a model that can be used to improve image and video quality assessment over MSE/PSNR (hereinafter sometimes referred to as simply 'PSNR') related approaches. HVS-based objective quality assessment metrics include the Visual Difference Predictor (VDP) and the Just Noticeable Difference (JND) metric. An embodiment uses an HVS model, which accurately describes a mechanism, modality or process with which the human visual system typically perceives visual quality, to make decisions on the visual quality that are statistically similar or comparable to MOS statistics or similar metric, which are considered to be quite reliable.

FIG. 16 depicts an example of VDP, with which an embodiment of the present invention may be practiced. As with some other HVS-based quality assessment methods, the image signals are first scaled. Scaling the image signals accounts for the non-linear response of HVS to luminance, which may be referred to as Amplitude Compression. Filtering that is based, at least in part, on a contrast sensitivity function (CSF) is applied. The CSF filtering account for the relative (e.g., or varying) sensitivity of the HVS to different spatial and temporal frequencies. A cortex transform and visual masking then separate the images into spatial, temporal, and orientation channels and calculate perceived errors in each channel. Finally, the calculated errors in all channels are combined into a single value.

Unfortunately however, HVS-based objective quality assessment methods rely on the HVS, which is highly complex and nonlinear. Moreover, deep, practical understanding of how human vision and visual perception actually work is, at best, in a very early stage of scientific development. Some conventional models of the human vision are based on certain assumptions that characterize the HVS as a linear or quasi-linear model using highly simplified stimuli such as spots, bars, or ramps. Performance metrics associated with these essentially linear or quasi-linear quality assessment metrics, as compared to simpler metrics such as PSNR, is for the most part inconclusive at this time. However, it has been shown that none of these linear or quasi-linear quality assessment metrics is statistically more reliable, despite the significantly higher computational cost and complexity such metrics typically demand. PSNR thus remains a dominant quantitative performance metric for the image and video applications.

Example HDR, VDR, and WCG Image and Video Quality Assessment

PSNR approaches are used in SDR image and video applications. There are in fact few effective alternatives to the PSNR approach in the SDR space. Unfortunately, the performance of MSE/PSNR approaches suffers (e.g., degrades) when applied to HDR and/or VDR images. For some applications with HDR/VDR image and video signals, the performance of PSNR approaches may simply fail to acceptably perform, e.g., at some minimal level or metric of satisfaction. At least a significant reason for this PSNR approach performance issue relates to the relative inability of the human visual system to scale linearly and/or uniformly from very bright areas to very dark areas of an i3mage scene.

Where a total encompassed dynamic range is relatively small, as is the case in the SDR image and video signals, which typically comprise 2-3 orders of magnitude of dynamic range, such nonlinearity or non-uniformity is tolerable, even if imperfect. However, HDR/VDR image and video signals may contain 5-6 or more orders of magnitude of dynamic ranges. With so wide a dynamic range, the impact of such nonlinearity and/or non-uniformity is substantially more significant.

Laying aside temporarily (e.g., ignoring) the perceptual impact (e.g., on or to typical human viewers) and focusing solely on the numerical difference moreover, PSNR approaches tend to over-estimate the differences in high brightness areas, and under-estimate the differences in low brightness areas. For example, a 5 $cd/m^2$ (candela per meter squared, sometimes referred to as "nits") difference is far more obvious when the background is at a 10 $cd/m^2$ luminance than the same difference in the background of 10,000 $cd/m^2$. However, the contribution of the 5 $cd/m^2$ difference, in either background luminance, to PSNR is the same.

Figure 17:
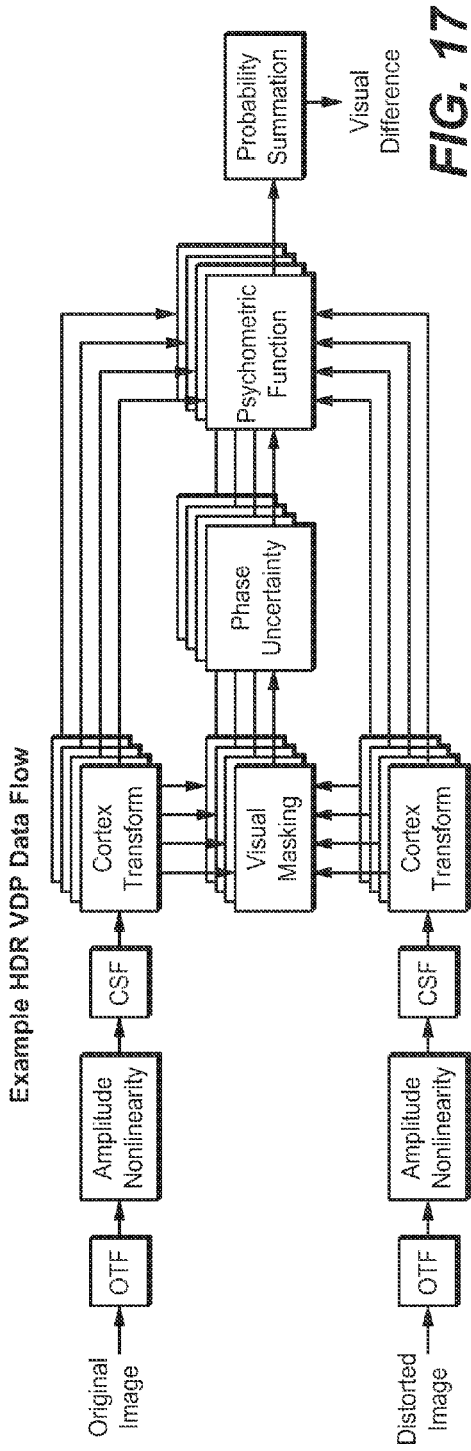
FIG. 17 depicts an example extension of a VDP metric to an HDR space, with which an embodiment of the present invention may be practiced.

FIG. 17 depicts an example extension of a VDP metric to an HDR space, with which an embodiment of the present invention may function. So called 'HDR VDP' comprises a full reference HDR quality assessment metric. In essence, HDR VDP comprises or represents an extension of the VDP metric to the HDR space.

As compared to VDP, 'HDR VDP' is extended over three stages. In a first of the three stages, modeling related to the HVS is performed. To account for the effect of significant (e.g., marked or dramatic) contrast changes in HDR/VDR signals, images may first be filtered with an Optical Transfer Function (OTF). The OTF simulates light scattering in the cornea, lens, and retina of a typical human eye. In comparison to VDP, which typically models a photoreceptor, HDR VDP converts luminance values into a nonlinear space. In the second of the three stages, the non-linear space into which HDR VDP coverts the luminance values is scaled in JND units. In the third of the three stages, CSF models any loss of sensitivity relating to the HDR VDP approach. An additional or alternative embodiment may similarly function with a linear, linearized, substantially linear, or approximately space.

Extending HDR VDP (e.g., in comparison to VDP) over the three stages, as well as the addition of the HVS modeling characteristic of the VDP itself, adds significant complexity and computational and other costs. Conventional approaches to HDR VDP may thus be impracticable or essentially unfeasible for relatively large scale implementations. However, such large scale implementations may be useful in applications that include optimizing image and video processes (e.g., image/video algorithm optimizations).

Example Embodiments

An example embodiment of the present invention assesses a visual difference between a first image and/or video signal and a second image and/or video signal, each of which have a high dynamic range (HDR) or a visual dynamic range (VDR), and/or a wide color gamut (WCG). The image and/or video signals are processed and assessed. The output of the assessment is provided in the form of a numerical result or a difference map where the levels of the differences between the first and second image and video signals are marked. In an example embodiment, the HDR, VDR and WCG image and video signals are processed to account for perceptual non-uniformity. In an example embodiment, a visual difference between the processed signals is measured. In an example embodiment, an assessment outcome is generated as an output. The assessment outcome output may be in the form of numerical results and/or a difference map, in which levels of the differences between the first and the second image and video signals are marked. In an example embodiment, a parameterized function family is used to process the HDR, VDR and WCG image and video signals. In an example embodiment, these quality assessment processes are applied to color channels. In an example embodiment, these quality assessment techniques are applied to optimize image and video processes (e.g., algorithm optimizations).

Figure 18:
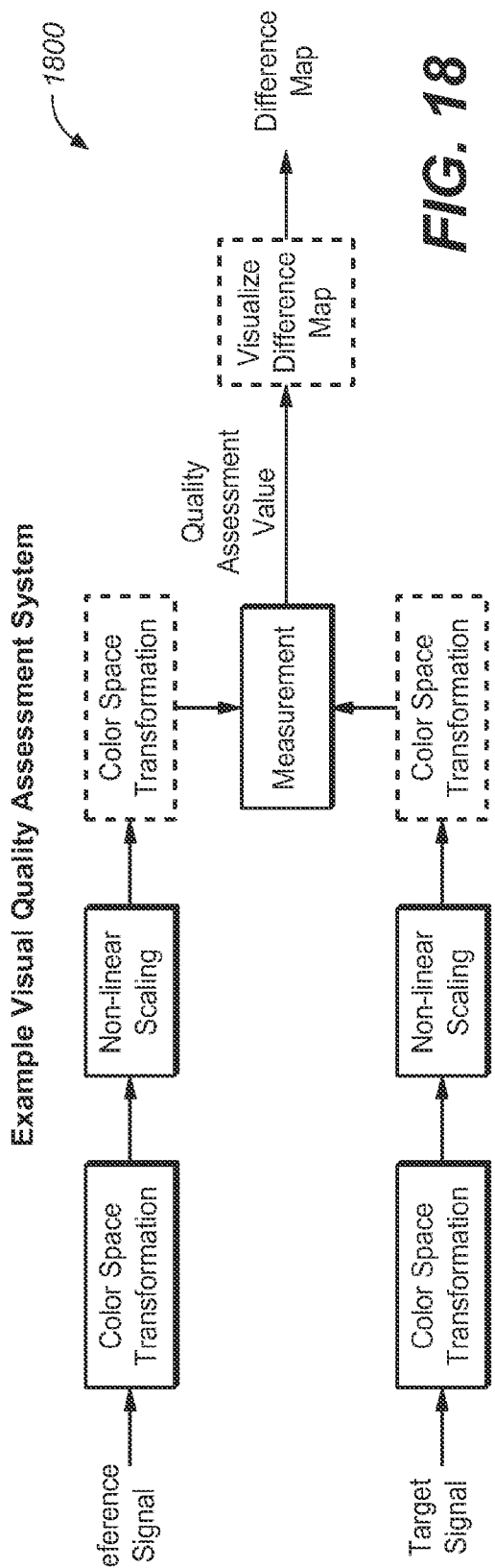
FIG. 18 depicts an example assessment of a visual difference between a pair of HDR, VDR, and WCG image and/or video signals, according to an embodiment of the present invention.

FIG. 18 depicts an example assessment of a visual difference between a pair of HDR, VDR, and WCG image and video signals, according to an embodiment of the present invention. A first signal represents a reference signal, e.g., of a known, standard, or reference-level visual quality. A second signal represents a target signal, the visual quality of which is assessed in relation to that of the reference signal. Note that in the context of the last two sentences, the terms "first" and "second" relate to identifiably distinguishing, labeling or naming the reference and target signals, and are expressly not used in an ordinal or temporal sense (e.g., which otherwise would imply that a reference signal precede a target signal in time or order).

As used in FIG. 18, blocks that are depicted as bounded with dotted lines comprise optional components of a system in an embodiment. The signals are first transformed to an HDR/VDR compatible color space. Non-linear scaling is then applied to the color transformed signals, to account for the perceptual non-uniformity before the measurement is taken. The assessment result can be represented by numerical values or visualized with difference maps. An additional or alternative embodiment may similarly function with a linear, linearized, substantially linear, or approximately linear scaling.

Figure 19:
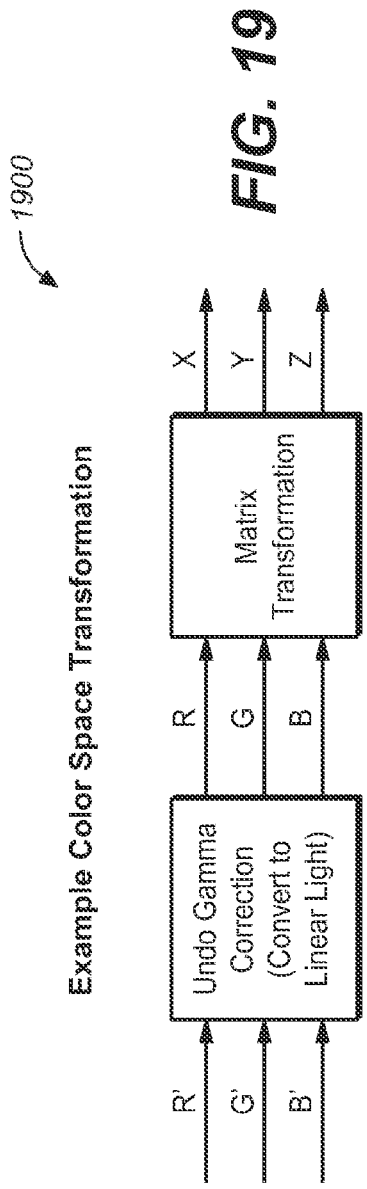
FIG. 19 depicts a gamma encoded RGB signal that is transformed to an example HDR/VDR color space, with which an embodiment of the present invention may be implemented.

The reference signal is first transformed to the HDR/VDR compatible color space. The CIE 1931 XYZ color space, known to artisans skilled in fields relating to color science, colorimetrics, images, video, photography and the like, comprises or represents an example HDR/VDR color space. FIG. 19 depicts a gamma encoded RGB signal that is transformed to an example HDR/VDR color space, with which an embodiment of the present invention may be implemented.

In an embodiment, converting the gamma encoded RGB signal into an HDR/VDR color space commences with reversing the gamma encoding. Gamma encoding may be undone to obtain essentially linear RGB values. Such linear RGB values may be transformed over one or more matrices, which may be known to those artisans skilled in field relating to color science, colorimetrics, images, video, photography and the like, to produce the CIE XYZ tri-stimulus values. An example conversion matrix, from (R, G, B) tri-stimulus values to the (X, Y, Z) tri-stimulus values is defined by the International Telecommunications Union (ITU) Recommendation ITU-R BT.709 according to Equation 2A, below.

$$\begin{bmatrix} X \\ Y \\ Z \end{bmatrix} = \begin{bmatrix} 0.412424 & 0.357579 & 0.180464 \\ 0.212656 & 0.715158 & 0.072186 \\ 0.019332 & 0.119193 & 0.950444 \end{bmatrix} \begin{bmatrix} R \\ G \\ B \end{bmatrix} \quad (2A)$$

An embodiment then applies a nonlinear scaling to the luminance related value, Y. The nonlinear scaling helps account for perceptual non-uniformity that may occur upon the color space transformation. Scaling may not be restricted to the luminance component Y. An embodiment applies scaling in the color channels, which enables color gamut mapping. For example, the nonlinear scaling on Y can be represented with a parameterized family of functions F as computed according to Equations 2B, below.

$$Y_d = \sum_{n=0}^{N-1} f_n(Y) \quad (2B)$$

$$\vec{F} = \{f_0, f_1, \ldots, f_{n-1}\}$$

In Equations 2B, the expression $f_i(\bullet)$ represents a function of the HDR/VDR luminance value Y.

Figure 20:
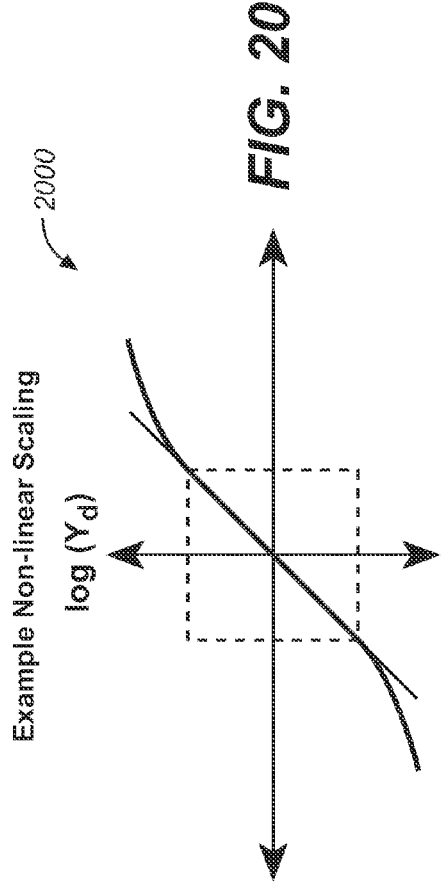
FIG. 20 depicts a representation of an example non-linearly scaled HDR/VDR luminance value, according to an embodiment of the present invention.

An embodiment then applies a nonlinear scaling to the luminance related value, Y. FIG. 20 depicts a representation of an example non-linearly scaled HDR/VDR luminance value, according to an embodiment of the present invention. The nonlinear scaling helps account for perceptual non-uniformity that may occur upon the color space transformation. An additional or alternative embodiment however may similarly function with a linear, linearized, substantially linear, or approximately linear scaling.

Current modeling of human visual system is complex and in some ways, at least partially inaccurate. An embodiment however uses a model that is based, at least in part, on photographic mapping, for example as computed with Equation 3A, below. Photographic mapping according to an embodiment, while simple, effectively scales the dynamic range while maintaining high contrast details in the very bright and very dark areas. In Equation 3 below, $$L = \frac{a}{\overline{Y}} \cdot Y,$$

wherein $\overline{Y}$ represents the log-average luminance associated with a scene, and α denotes a parameter that represents a key for the scene. An embodiment may be implemented wherein the default key value α comprises a value that approaches or approximates 18%, which corresponds to a conventional middle-grey value. Equation 3A thus computes the scaled value as $$L_d = \frac{L \cdot \left(1 + \frac{L}{L_{white}^2}\right)}{1 + L} \quad (3A)$$

wherein the expression $L_{white}$ represents a smallest luminance value that will be mapped to "pure white." An embodiment then converts the nonlinearly scaled signal to more linear XYZ tri-stimulus values according to Equations 3B, below.

$$Y_d = L_d \quad (3B)$$

$$X_d = \max\left(0, \frac{L_d}{Y} X\right)$$

$$Z_d = \max\left(0, \frac{L_d}{Y} Z\right)$$

An embodiment uses the XYZ tri-stimulus values computed as Equation 3A, or alternatively (or additionally) uses another color. For example, an embodiment further converts the XYZ tri-stimulus values to the RGB color space and gamma encodes the result, as computed with Equation 3C, below.

$$\begin{bmatrix} R_d \\ G_d \\ B_d \end{bmatrix} = \begin{bmatrix} 3.240708 & -1.537259 & -0.498570 \\ -0.969257 & 1.875995 & 0.041555 \\ 0.055636 & -0.203996 & 1.057069 \end{bmatrix} \begin{bmatrix} X_d \\ Y_d \\ Z_d \end{bmatrix} \quad (3C)$$

$$R'_d = 255 * R_d^{1/\gamma}$$

$$G'_d = 255 * G_d^{1/\gamma}$$

$$B'_d = 255 * B_d^{1/\gamma}$$

In Equations 3C, the exponential expression γ represents a selected gamma value. Assessments may thus be performed over the gamma-encoded RGB space. A similar (e.g., essentially identical) process may be applied to the target signal.

The two processed signals are then compared in a measurement unit to determine a visual difference. The measurement can be based on existing or new quality measurement methods. For example, an embodiment may be implemented with a Structural SIMilarity Index (SSIM) based measurement. The SSIM, in contrast to PSNR approaches (which only measures the mean square difference between the two signals), includes three separate components: (1) intensity comparison, (2) contrast comparison, and (3) structure comparison. The three separate components account well for visual differences in HDR/VDR signals. Moreover computing SSIM, while perhaps somewhat more complex than PSNR approaches, achieves efficiencies that exceed HVS-based metrics such as VDP or JND.

Figure 21:
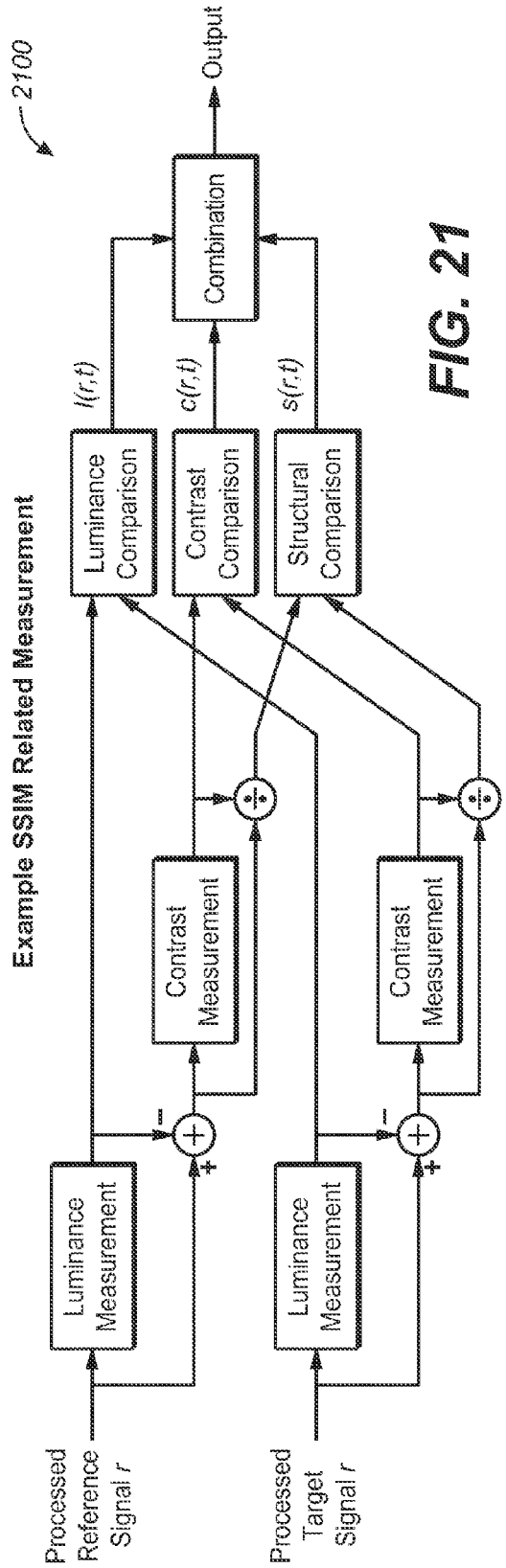
FIG. 21 depicts an example comparison of signal intensities, according to an embodiment of the present invention.

FIG. 21 depicts an example comparison of signal intensities, according to an embodiment of the present invention. The signal that is transformed and scaled signal from the reference signal is represented with the expression r. The signal that is transformed and scaled signal from the target signal is represented with the expression t. An intensity of these two signals is compared and a measurement of the comparison l(r, t) is computed. The mean intensity is removed from the signal and the standard deviations of the resulting signals are compared, with which an estimate is computed that relates to the signal contrast difference c(r,t). An embodiment normalizes the signals, such that the compared signals each have a unit standard deviation. An embodiment compares the normalized signals to indicate a value that relates to the structural difference s(r,t). An embodiment combines the three indicators, which effectively computes an overall quality measure of the two input signals.

An embodiment computes a combined quality assessment Q(r, t) according to the expression:

$$Q(r,t) = [l(r,t)]^{\alpha} \cdot [c(r,t)]^{\beta} \cdot [s(r,t)]^{\gamma}$$

in which α>0, β>0, and γ>0 represent parameters that are used to adjust the importance of these three components and $$l(r,t) = \frac{2\mu_r\mu_t + C_1}{\mu_r^2 + \mu_t^2 + C_2}, \; c(r,t) = \frac{2\sigma_r\sigma_t + C_2}{\sigma_r^2 + \sigma_t^2 + C_2}, \; s(r,t) = \frac{\sigma_{rt} + C_3}{\sigma_r\sigma_t + C_3}$$

in which $\mu_r$ and $\mu_t$ represent the local sample means of r and t, $$\mu_r = \frac{1}{N}\sum_{i=1}^{N} r_i, \; \mu_t = \frac{1}{N}\sum_{i=1}^{N} t_i$$

in which N represents the size of the samples, and $\sigma_r$ and $\sigma_t$ represent the local sample standard deviations of r and t, and $$\sigma_r = \left(\frac{1}{N-1}\sum_{i=1}^{N}(r_i - \mu_r)^2\right)^{1/2}, \; \sigma_t = \left(\frac{1}{N-1}\sum_{i=1}^{N}(t_i - \mu_t)^2\right)^{1/2}$$

in which $\sigma_{rt}$ represents the sample cross correlation of r and t, $$\sigma_{rt} = \frac{1}{N-1}\sum_{i=1}^{N}(r_i - \mu_r)(t_i - \mu_t)$$

in which $C_1$, $C_2$ and $C_3$ comprise relatively small positive constants, which avoid numerical instability near zero sample means.

An embodiment sets the default values as α=β=γ=1, such that $$Q(r,t) = l(r,t) \cdot c(r,t) \cdot s(r,t) = \left(\frac{2\mu_r\mu_t + C_1}{\mu_r^2 + \mu_t^2 + C_1}\right) \cdot \left(\frac{2\sigma_r\sigma_t + C_2}{\sigma_r^2 + \sigma_t^2 + C_2}\right) \cdot \left(\frac{\sigma_{rt} + C_3}{\sigma_r\sigma_t + C_3}\right).$$

An embodiment may thus assess visual quality on a pixel level, block level and/or an image level. In an embodiment, blocks may be over-lapped or non-overlapped. For each pixel, block or image, an embodiment assigns a numerical value between [0, 1] to Q(r,t), in which a higher number indicates a better match between the reference signal and the target signal. When the assessment is done on a pixel or block level, an embodiment assigns an overall numerical value AQ in relation to a quality characteristic of the whole image or frame, which may combine a quality assessment of each individual block of the image or frame, as for example in Equation 4, below.

$$AQ = \frac{1}{M}\sum_{j=1}^{M} Q(r_j, t_j)$$

In Equation 4, the expression M represents the number of blocks ($r_j$, $t_j$) of the image/frame.

The approach used in this embodiment is applied over a luminance related channel. However, an embodiment may also apply a similar approach over channels related to other image characteristics, such as chrominance, chroma or other color related attributes. To assess image quality over multiple channels, an embodiment obtains an individual value associated with each of the channels. The values obtained may be further processed to obtain a single overall value for the whole image or frame. For example, an embodiment may process the values obtained with a simple averaging computation, run over the values that are obtained for each of the individual channels.

An embodiment assesses a visual difference between video signals. The video signals are initially divided into a sequence of frames, slices or fields. The approach described above, e.g., with reference to Equation 4, is applied to each frame, slice or field and a numerical value is obtained for each of them. An embodiment further processes the values for all frames, slices and fields to obtain a single overall value for the whole video sequence. For example, an embodiment may process the values obtained with a simple averaging computation, run over the values that are obtained for each individual frame, slice or field.

An embodiment visualizes assessment results with quantizing the assessment result values, which range between [0, 1], to an L-bit uniform representation, in which $2^L-1$ in the L-bit representation corresponds to 1 in the assessment result, and in which 0 in the L-bit representation corresponds to 0 in the assessment result. The quantized results may be arranged in the same spatial location as the original pixel or block and output as an L-bit image.

A variety of test images and test sequences are familiar to artisans skilled in fields that relate to video, imaging, photography, cinema and the like, and are used in various efforts (e.g., endeavors, tests, experiments, demonstrations, depictions and descriptions) to present uniform spatial visual information, such as for comparisons between different techniques or approaches. Two familiar test sequences, which are sometimes used to uniformly present spatial visual information, include the sequences that are commonly referred to (e.g., well known as in the related fields) as "Sunset" and "Desert to Sea." FIG. 22A, FIG. 22B, FIG. 23A, FIG. 23B, FIG. 24A and FIG. 24B depict example comparisons of test sequence images, according to an embodiment. FIG. 22A and FIG. 22B depict example adjacent (e.g., temporally or ordinally sequential) images (e.g., frames) 2201 and 2202 of an example test sequence portion, taken from the Sunset test sequence.

Visual quality assessment results may be output, stored and/or displayed as a difference map, e.g., a map of values that are associated with visible differences between two or more images in an image sequence. For example, a difference map may be computed, which shows the differences between two ordinally adjacent images in a sequence of images, such as two temporally adjacent frames in a video signal. FIG. 22C, FIG. 22D, FIG. 23C, FIG. 23D, FIG. 24C and FIG. 24D depict example comparisons of difference maps, according to an embodiment. FIG. 22C and FIG. 22D depict respectively distinct example visual quality assessment difference maps associated with the first frame 2201 and the second frame 2202 in the Sunset test sequence. In FIG. 20C, difference map 2205 depicts an example HDR VDP based visual quality assessment difference map between the first frame 2201 and the second frame 2202. For comparison, FIG. 22D, difference map 2206 depicts an example visual quality assessment difference map, which is generated according to an embodiment.

Both the example Sunset test sequence that is depicted in FIG. 22A and FIG. 22B, and the Desert to Sea test sequence (which is described below in relation to FIG. 23A, 23B) have visible details that appear in a relatively very bright area, as well as details that appear in a relatively very dark area, appearing in the same image. As described above, an embodiment visualizes assessment results with quantizing of the assessment result values, which range between [0, 1], to an L-bit uniform representation. The value $2^L-1$ in the L-bit representation corresponds to 1 in the assessment result, and the value 0 in the L-bit representation corresponds to 0 in the assessment result. The quantized results may be arranged in the same spatial location as the original pixel or block and output as an L-bit image.

In FIG. 22D, difference map 2206 is marked according to a visualization technique computed according to an embodiment, in which the value of L=8. In FIG. 22C for an example comparison, difference map 2205 is marked according to an HDR VDP technique. For each pixel (e.g., of images 2201 and 2202), HDR VDP computes a value p, which corresponds to the probability that the reference signal and the target signal differ at those pixel. The value 1−0.5*p, which is between [0.5, 1], is uniformly quantized to [128, 255], wherein the value 255 corresponds to p=0 and the value 128 corresponds to p=1.

Results of the HDR VDP test shown in FIG. 22C and results of the test shown in FIG. 22D according to an embodiment are not aligned numerically because the values respectively associated with each do not have the same meaning or definition. While the numerical results of these visual assessment tests may thus not be directly comparable, in both difference map 2205 and difference map 2206, darker appearing areas in the difference maps indicate a more significant or more obvious visual difference between the reference signal and the target signal than the lighter appearing areas. Conversely, the lighter appearing areas indicate a less significant (or less obvious) visual difference between the reference signal and the target signal.

Example images 2201 and 2202 respectively comprise the first original frame and the second original frame in the Sunset test sequence. Image 2201 and image 2202 each cover about five or six orders of magnitude in dynamic range, e.g., related to their brightness related values. The extent of their dynamic range ranges from a bright area (which depicts the sun, essentially at a center position) to a dim area (which depicts what appears to be a crowd of people). Image 2201 and image 2202 have contrast details at both the high end and the low end of their respective dynamic ranges. (It should be noted however that, due to dynamic range and color related restrictions associated with storage, rendering and printing of FIG. 22A and FIG. 22B in the instant Application, only a part of the dynamic range that exists in each of HDR image 2201 and HDR image 2202 may be rendered therewith using gray scale, in which both images 2201 and 2202 show the same portion of the available dynamic range scale.)

The visual quality assessment test maps 2205 and 2206, respectively depicted in FIG. 22C and FIG. 22D both/each highlight an area of high reflectance (seen on the depicted sea features in both images 2201 and 2202) as of relatively low visual quality. This highlighting is perhaps most apparent in association with the area in each of images 2001 and 2002 that show direct reflectance. In areas of images 2201 and 2202 that have less significant differences (and/or areas without differences), assessment results computed according to an embodiment correlate well with assessment results computed with conventional HDR VDP techniques. With such high correlations, embodiments of the present invention achieve an accuracy comparable to those associated with visual assessment results achieved with conventional HDR VDP, which are well accepted and used by artisans skilled in fields relating to images, video, cinema, photography, color, colorimetrics, and the like.

However, significant or notable latency may be associated with conventional HDR VDP computations. VDP measurements model the human visual system (e.g., incompletely). Moreover, VDP extensions to HDR involve even more complicated modeling, which take into account some human visual perception behaviors. These add models add significant complexity to the HDR VDP quality assessment. An embodiment may perform visual quality assessment independent of such perceptual modeling, and may thus function with less latency than HDR VDP approaches.

An embodiment computes a visual quality assessment independent of (e.g., without) a complex (and/or incomplete) perceptually based modeling of the HVS. An embodiment uses a relatively simple model that may be similar to a photographic technique. An embodiment maps HDR/VDR signals into a representative space or set of dimensions in which visual quality assessment may be measured more simply than with perceptual based approaches. In similar test environments, an embodiment assesses visual quality results with a significant reduction in latency, in relation to perceptual based models, such as HDR VDP.

Embodiments assess visual quality results with significantly less latency than may be achieved with conventional HDR VDP or other perceptual based approaches. For example, an embodiment may be implemented that assesses visual quality between one and two orders of magnitude (e.g., approx. 50 times) faster than HDR VDP. Moreover, an embodiment may be characterized with a modular structure, which is simple and efficient in comparison to some implementations of perceptual based assessment systems. Software and hardware implementations of an embodiment may thus be open to further (e.g., newly developing) optimizations.

In FIG. 23A and FIG. 23B, assessment results are depicted over a pair of adjacent, or temporally and/or ordinally sequential, original frames 2301 and 2302 in the 'Desert to Sea' test sequence. Frame 2301 and frame 2302 each/both include details in the brighter area (near the depicted sun feature) and details in the dimmer area (depicting flowers). The Desert to Sea test clip was captured with a professional quality camera and processed in professional level post production facilities. As used herein the term "professional" may relate to a level of quality, complexity, capability, know-how and/or skill that may be used by or associated with artisans of ordinary skill in fields relating to images, video, color, colorimetrics, photography, cinematography or the like.

Assessing visual quality of image content such as frames 2301 and 2302 of the Desert to Sea (and/or frames 2201 and 2202 of the Sunset) test sequence according to an embodiment allows for optimizable and/or low latency benchmarking and monitoring the quality of cameras and other devices used to capture the images therein. Frames 2301 and 2302 each cover about 5-6 orders of magnitude. (It should be noted however that, due to dynamic range and color related restrictions associated with storage, rendering and printing of FIG. 23A and FIG. 23B in the instant Application, only a part of the dynamic range that exists in each of HDR image 2301 and HDR image 2302 may be rendered therewith using gray scale, in which both images 2301 and 2302 show the same portion of the available dynamic range scale.)

The differences between image 2301 and image 2302 and shown in FIG. 23C and FIG. 23D, as marked according to an embodiment. For an example comparison, the differences between image 2301 and image 2302 are shown in difference map 2305, as marked by a conventional HDR VDP approach. Difference map 2306 shows the differences, as computed according to an embodiment of the present invention. Difference maps 2305 and 2306 closely correspond in identifying areas in each of frames 2301 and 2302 that have differences of high significance and low (or zero) difference. Thus, an embodiment may assess visual quality at least about as accurately as the well established and widely used perceptually based approaches such as HDR VDP.

Moreover, in most cases and under similar test environments, an embodiment computes a visual quality assessment with significantly less latency than conventional perception based approaches. For example, while computed under similar test conditions, an embodiment generated difference map 2306 with about two full orders of magnitude less latency than a commonly used HDR VDP technique generated difference map 2205. In the implementation shown in relation to difference map 1006, an embodiment functions about 100 times faster than the HDR VDP approach that was used, which is shown in relation to difference map 2105 for comparison.

FIG. 24A and FIG. 24B depict example images, both from the Sunset test sequence. FIG. 24A depicts an original image 2401 from the Sunset test sequence. FIG. 24B depicts an image instance 2402 from the Sunset test sequence. To generate image instance 2402, the original image 2401 was first encoded in a compressed VDR format, and then subsequently decoded into decompressed VDR image 2402 from the compressed encoded instance of the original image 2401. FIG. 24C and FIG. 24D depict example difference maps between original image 2401 and the compressed and decompressed encoded image instances 2402. FIG. 24C depicts a difference map 2405, which was generated with HDR VDP. FIG. 24D depicts a difference map 2406, which was generated according to an embodiment.

The visual quality assessment test maps 2405 and 2406, respectively depicted in FIG. 24C and FIG. 24D, both/each highlight an area of high reflectance (seen on the depicted sea features in both images 2401 and 2402) as of relatively low visual quality. This highlighting is perhaps most apparent in association with the area in each of images 2401 and 2402 that show direct reflectance. In areas of images 2401 and 2402 that have less significant differences (and/or areas without differences), assessment results computed according to an embodiment also correlate well with assessment results computed with conventional HDR VDP techniques. With such high correlations, embodiments of the present invention achieve an accuracy that is comparable to those associated with visual assessment results achieved with conventional HDR VDP.

Difference maps 2405 and 2406 closely correspond in identifying areas in each of frames 2401 and 2402 that have differences of high significance and low (or zero) difference. Thus again, an embodiment may assess visual quality at least about as accurately as the well established and widely used perceptually based approaches. An embodiment computed difference map 2406 about 50 tines faster that difference map 2405 was computed with HDR VDP. The significant latency reduction in assessing visual quality according to an embodiment in comparison to perceptual based approaches promotes optimization in processes such as image and video algorithms, in which hundreds or thousands of measurements may be used in encoding or processing each image or video frame. Thus, an embodiment may be useful in implementing a video encoder.

Figure 25:
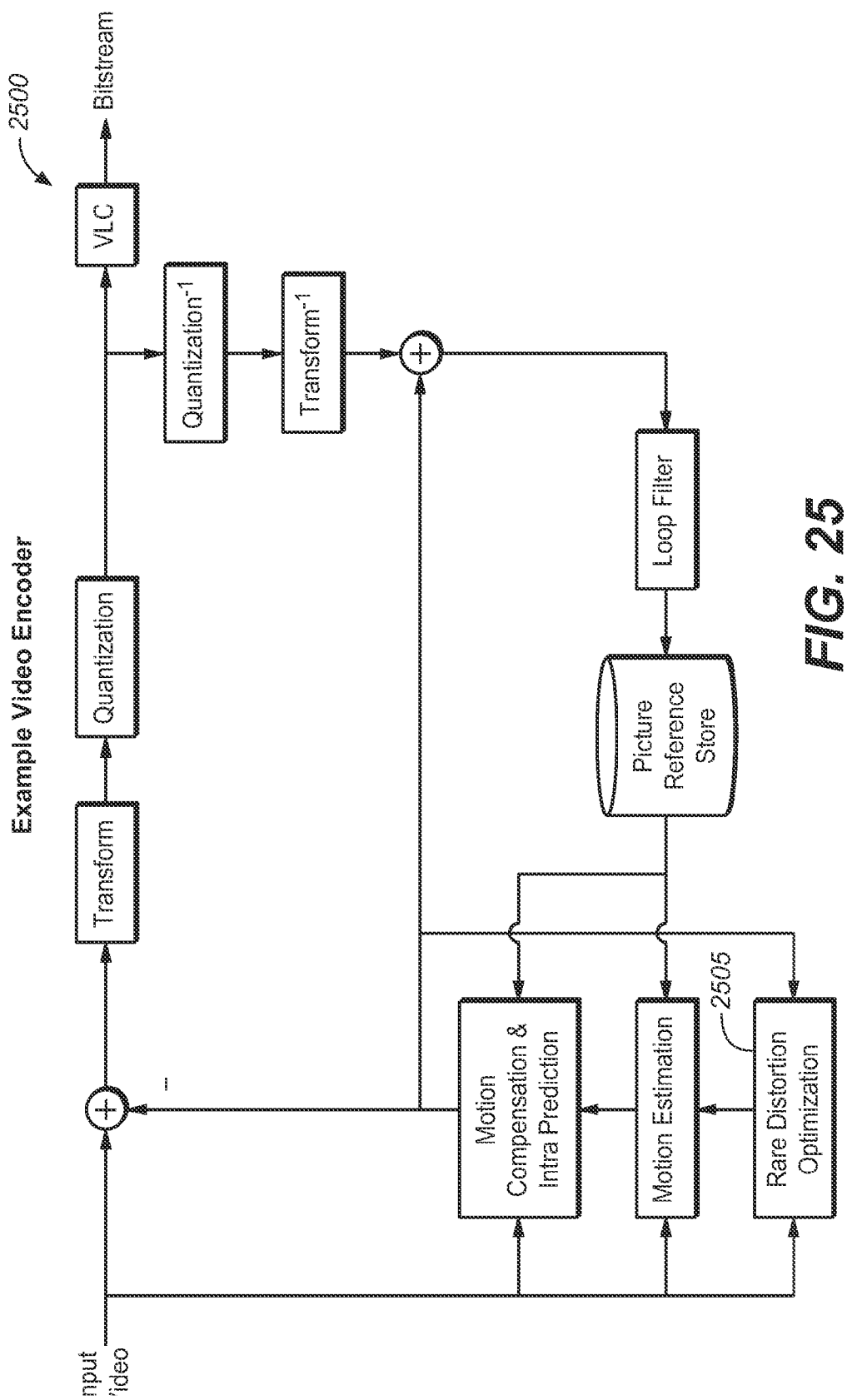
FIG. 25 depicts an example video encoding system, with which an embodiment of the present invention may be used.

FIG. 25 depicts an example video encoding system 2500, with which an embodiment of the present invention may be used. Video encoder 2500 includes a rate/distortion optimization module 2505. An embodiment may be implemented with rate/distortion optimizer 2505. An embodiment computes a visual difference D over one or more of a pixel, block or frame level, between an encoded signal (e.g., a target signal) and a original signal (reference signal). An embodiment also computes a bit rate R for encoding a target area. An embodiment computes an overall rate distortion cost function C according to Equation 5, below.

$$C = R + \lambda \cdot D \qquad (5)$$

In Equation 5, the term $\lambda$ represents a coefficient, such as a Lagrangian cost optimator for example, which balances a tradeoff between the bit rate and a targeted distortion parameter. An embodiment evaluates the rate distortion cost function computations for each possible encoding mode. In an embodiment, rate/distortion optimizer 1205 selects the encoding mode that is evaluated to have the smallest rate distortion cost function.

Example Process

Figure 26:
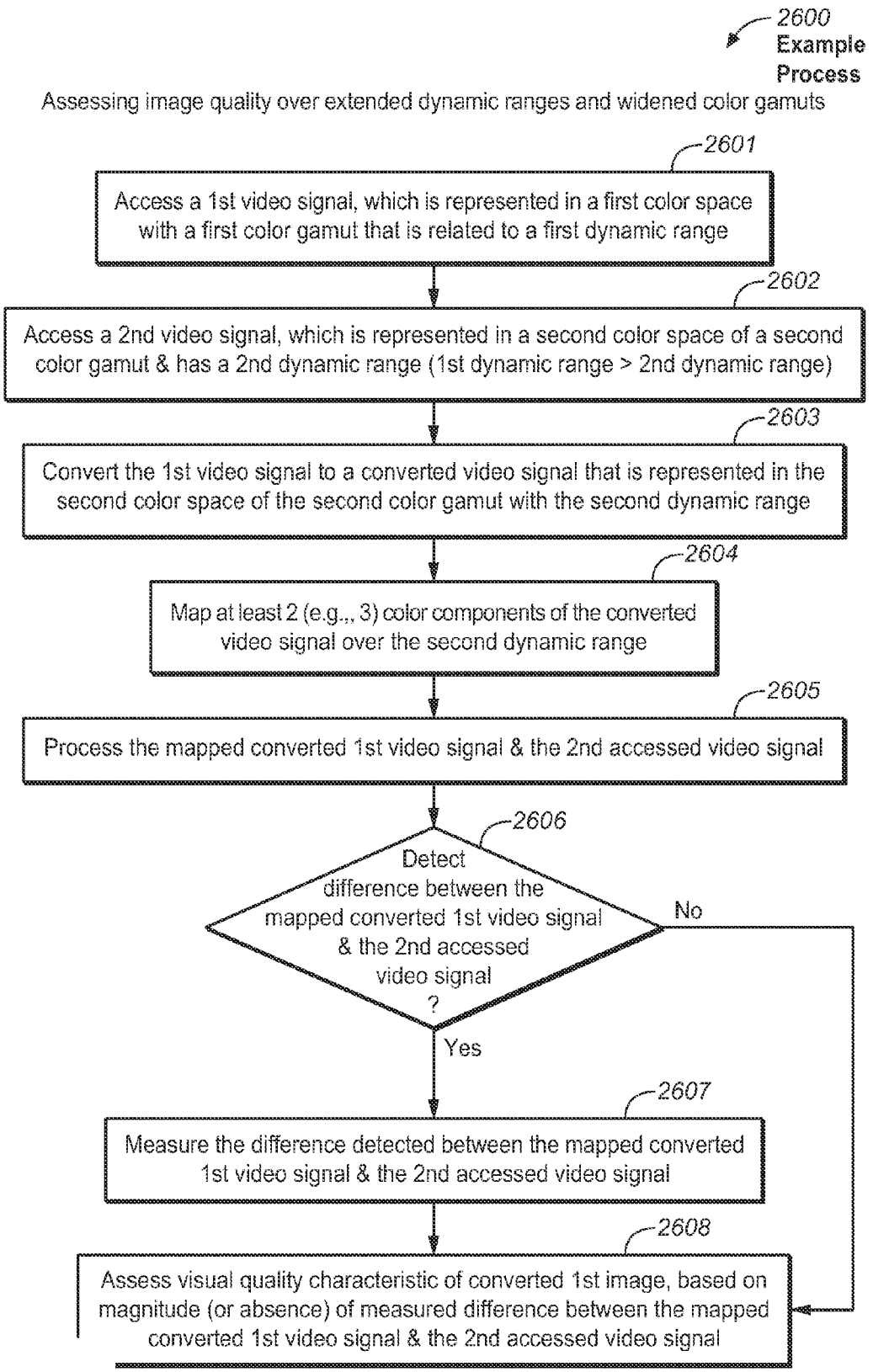
FIG. 26 depicts a flowchart of an example process for assessing image quality over extended dynamic ranges and wide color gamuts, according to an embodiment of the present invention.

FIG. 26 depicts a flowchart of an example process 2600 for assessing image quality over extended dynamic ranges and wide color gamuts, according to an embodiment of the present invention. In step 2601, a first video signal is accessed, which is represented in a first color space with a first color gamut that is related to a first dynamic range. In step 2602, a second video signal is accessed, which is represented in a second color space of a second color gamut. The second color space is associated with a second dynamic range. In step 2603, the first accessed video signal is converted to a video signal that is represented in the second color space of the second color gamut, associated with the second dynamic range. In step 2604, at least two (e.g., three) color-related components of the converted video signal are mapped over the second dynamic range. In step 2605, the mapped first accessed video signal and the second accessed video signal are processed.

In step 2606, it is determined whether a difference, based on the processing, may be detected between the mapped first accessed video signal and the second accessed video signal. If a difference is detected between the mapped first accessed video signal and the second accessed video signal, that difference is measured in step 2607. Based on the magnitude of the difference measured (or the absence of a detected difference) between the mapped first accessed video signal and the second accessed video signal, a visual quality characteristic is assessed in step 2608. The visual quality characteristic is based, at least in part, on the measurement of the difference, which may be measured to exist between the processed first and second video signals. For example, a measured low (or absent, e.g., zero) difference between the mapped first accessed video signal and the second accessed video signal may be assessed as a high quality visual characteristic that characterizes the first accessed video signal, which has the high dynamic range in relation to the second accessed video signal.

Example Computer System Implementation

Embodiments of the present invention may be implemented with a computer system, computerized or other video apparatus, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to extending image and/or video dynamic range, such as are described herein. The computer and/or IC may compute, any of a variety of parameters or values that relate to assessing image quality over extended dynamic ranges and wide color gamuts and/or extending image and/or video dynamic range, e.g., as described herein. The assessing image quality over extended dynamic ranges and wide color gamuts and/or image and video dynamic range extension embodiments may be implemented in hardware, software, firmware and various combinations thereof.

Figure 27:
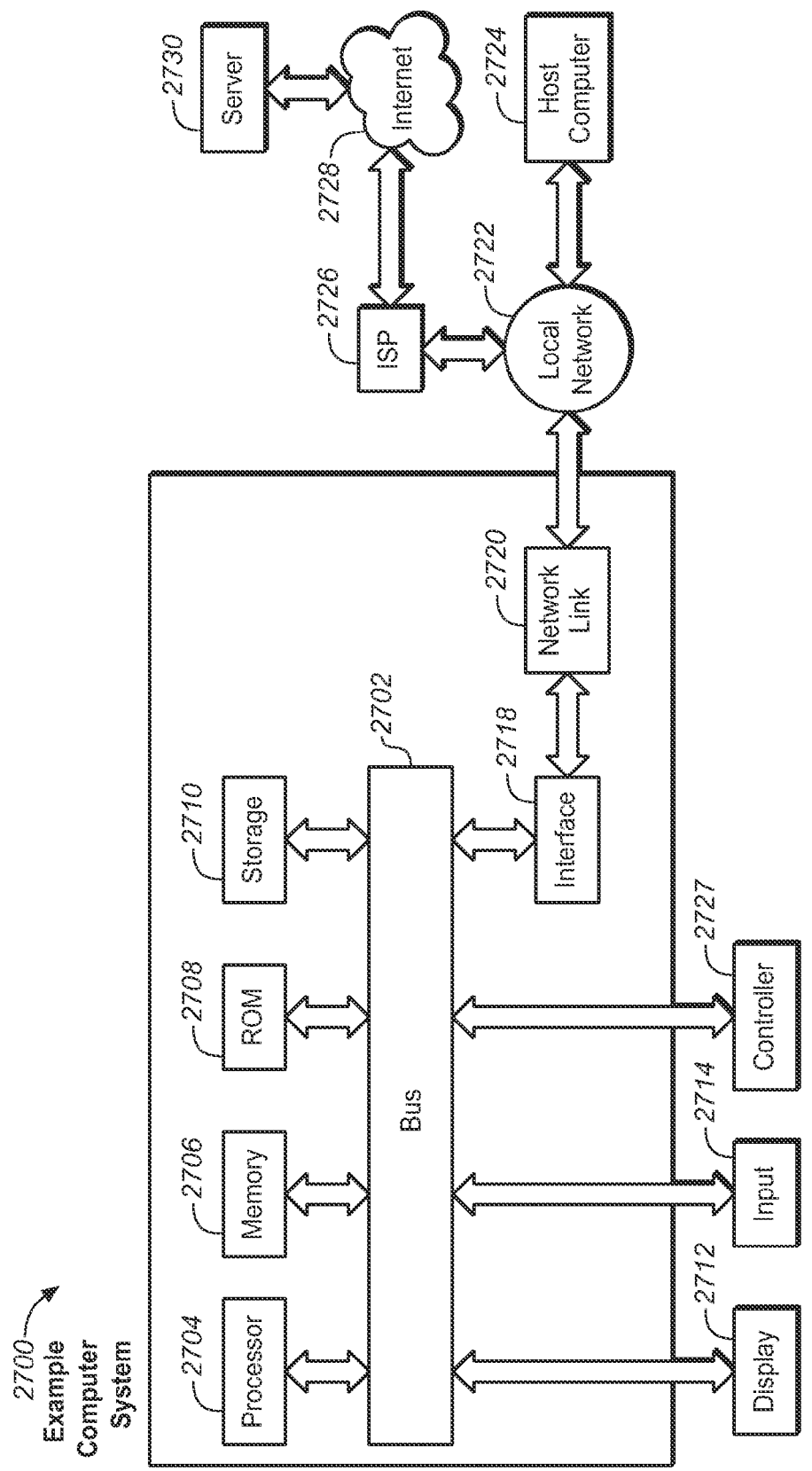
FIG. 27 depicts an example computer system platform, with which an embodiment of the present invention may be practiced.

FIG. 27 depicts an example computer system platform 2700, with which an embodiment of the present invention may be implemented. Computer system 2700 includes a bus 2702 or other communication mechanism for communicating information, and a processor 2704 coupled with bus 2702 for processing information. Computer system 2700 also includes a main memory 2706, such as a random access memory (RAM) or other dynamic storage device, coupled to bus 2702 for storing information and instructions to be executed by processor 2704. Main memory 2706 also may be used for storing temporary variables or other intermediate information during execution of instructions to be executed by processor 2704.

Computer system 2700 further includes a read only memory (ROM) 2708 or other static storage device coupled to bus 2702 for storing static information and instructions for processor 2704. A storage device 2710, such as a magnetic disk or optical disk, is provided and coupled to bus 2702 for storing information and instructions. Processor 2704 may perform one or more digital signal processing (DSP) functions. Additionally or alternatively, DSP functions may be performed by another processor or entity (represented herein with processor 2704).

Computer system 2700 may be coupled via bus 2702 to a display 2712, such as a liquid crystal display (LCD), cathode ray tube (CRT), plasma display or the like, for displaying information to a computer user. LCDs may include HDR/VDR and/or WCG capable LCDs, such as with dual or N-modulation and/or back light units that include arrays of light emitting diodes (LEDs). A example embodiment may be implemented with an LCD that uses a backlight unit (BLU) with local dimming features and/or modulation of BLU LEDs, wherein the BLU LEDs are modulated separately, independently or in synchronism, correspondence, or harmony with a first modulation, which is applied to changing the polarization states of liquid crystals that comprise the LCD face, upon which images are rendered. A particular example implementation uses a professional monitor, such as may be used in content production, "color timing" and/or other artistic or aesthetic activities.

An input device 2714, including alphanumeric and other keys, is coupled to bus 2702 for communicating information and command selections to processor 2704. Another type of user input device is cursor control 2716, such as haptic-enabled "touch-screen" GUI displays or a mouse, a trackball, or cursor direction keys for communicating direction information and command selections to processor 2704 and for controlling cursor movement on display 2712. Such input devices typically have two degrees of freedom in two axes, a first axis (e.g., x) and a second axis (e.g., y), which allows the device to specify positions in a plane.

Embodiments of the invention relate to the use of computer system 2700 for assessing image quality over extended dynamic ranges and wide color gamuts and/or extending image and/or video dynamic range. An embodiment of the present invention relates to the use of computer system 2700 to compute an assessment of image quality over extended dynamic ranges and wide color gamuts and/or to extend image and/or video dynamic range, as described herein. According to an embodiment of the invention, image quality is assessed over extended dynamic ranges and wide color gamuts. In an example embodiment, a first video signal is accessed, which is represented in a first color space with a first color gamut that is related to a first dynamic range. A second video signal is accessed, which is represented in a second color space of a second color gamut. The second color space is associated with a second dynamic range. The first accessed video signal is converted to a video signal that is represented in the second color space of the second color gamut with the second dynamic range. At least two color-related components of the converted video signal are mapped over the second dynamic range. The mapped first accessed video signal and the second accessed video signal are processed. Based at least in part on the processing of the mapped first accessed video signal and the second accessed video signal, a difference is measured, which may exist between the processed first and second video signals. A visual quality characteristic relates to a magnitude of the measured difference between the processed first and second video signals. The visual quality characteristic is assessed based, at least in part, on the measurement of the difference, which may be measured to exist between the processed first and second video signals.

In an embodiment, an input video signal that is represented in a first color space with a first color gamut and/or bit depth, which are related to a first dynamic range, is converted to a video signal that is represented in a second color space with a second color gamut and/or bit depth. The second color space is associated with a second dynamic range. At least two (e.g., three) color-related components of the converted video signal are mapped over the second dynamic range.

These features are provided, controlled, enabled, computed, provisioned, configured, programmed or allowed with computer system 2700 functioning in response to processor 2704 executing one or more sequences of one or more instructions contained in main memory 2706. Such instructions may be read into main memory 2706 from another computer-readable medium, such as storage device 2710. Execution of the sequences of instructions contained in main memory 2706 causes processor 2704 to perform the process steps described herein. One or more processors in a multi-processing arrangement may also be employed to execute the sequences of instructions contained in main memory 2706. In additional or alternative embodiments, hard-wired circuitry may be used in place of or in combination with software instructions to implement the invention. Thus, embodiments of the invention are not limited to any specific combination of hardware, circuitry, firmware and/or software.

The terms "computer-readable medium" and/or "computer-readable storage medium" as used herein may refer to any medium that participates in providing instructions to processor 2704 for execution. Such a medium may take many forms, including but not limited to, non-volatile media, volatile media, and transmission media. Non-volatile media includes, for example, optical or magnetic disks, such as storage device 2710. Volatile media includes dynamic memory, such as main memory 2706. Transmission media includes coaxial cables, copper wire and other conductors and fiber optics, including the wires that comprise bus 2702. Transmission media can also take the form of acoustic (e.g., sound, vibrational, phonon-based, etc.) or electromagnetic (e.g., optical, infrared, ultraviolet light, radio, microwave, etc.) waves, such as those generated during radio wave and infrared and other optical data communications.

Common forms of computer-readable media include, for example, certain legacy storage media such as a floppy disk, a flexible disk, a diskette, magnetic tape, or another magnetic medium, older legacy media such as punch cards, paper tape, any other legacy or other physical medium with patterns of holes or optical opacities, or somewhat more modern or contemporary (e.g., in relation to the filing date of the present Application) storage media such as a hard disk or flash-based storage medium, a CD-ROM, DVD, BD or any other optical medium, a random access memory (RAM), a programmable read-only memory (PROM), and/or erasable PROM (EPROM), a FLASH-EPROM, any other memory chip or cartridge, a carrier wave (e.g., as described hereinafter), or any other medium from which a computer can read.

Various forms of computer readable media may be involved in carrying one or more sequences of one or more instructions to processor 2704 for execution. For example, the instructions may initially be carried on a magnetic disk of a remote computer. The remote computer can load the instructions into its dynamic memory and send the instructions over a telephone line using a modem. A modem local to computer system 2700 can receive the data on the telephone line and use an infrared transmitter to convert the data to an infrared signal. An infrared detector coupled to bus 2702 can receive the data carried in the infrared signal and place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

Computer system 2700 also includes a communication interface 2718 coupled to bus 2702. Communication interface 2718 provides a two-way data communication coupling to a network link 2720 that is connected to a local network 2722. For example, communication interface 2718 may be a legacy integrated services digital network (ISDN) card or a digital subscriber line (DSL), cable, optical or other modem to provide a data communication connection to a corresponding type of electrical or optical telephone line. As another example, communication interface 2718 may be a local area network (LAN) card to provide a data communication connection to a compatible LAN. Communication interface 2718 may comprise an optical modem, for functions with fiber optic communications media. Wireless links may also be implemented. In any such implementation, communication interface 2718 sends and receives electrical, electromagnetic or optical signals that carry digital data streams representing various types of information.

Network link 2720 typically provides data communication through one or more networks to other data devices. For example, network link 2720 may provide a connection through local network 2722 to a host computer 2724 or to data equipment operated by an Internet Service Provider (ISP) (or telephone switching company) 2726. In an embodiment, local network 2722 may comprise a communication medium with which encoders and/or decoders function. ISP 2726 in turn provides data communication services through the worldwide packet data communication network now commonly referred to as the "Internet" 2728. Local network 2722 and Internet 2728 both use electrical, electromagnetic or optical signals that carry digital data streams. The signals through the various networks and the signals on network link 2720 and through communication interface 2718, which carry the digital data to and from computer system 2700, are exemplary forms of carrier waves transporting the information.

Computer system 2700 can send messages and receive data, including program code, through the network(s), network link 2720 and communication interface 2718.

In the Internet example, a server 2730 might transmit a requested code for an application program through Internet 2728, ISP 2726, local network 2722 and communication interface 2718. In an embodiment of the invention, one such downloaded application provides for extending image and/or video dynamic range described herein.

The received code may be executed by processor 2704 as it is received, and/or stored in storage device 2710, or other non-volatile storage for later execution. In this manner, computer system 2700 may obtain application code in the form of a carrier wave.

Example IC Device Platform

Figure 28:
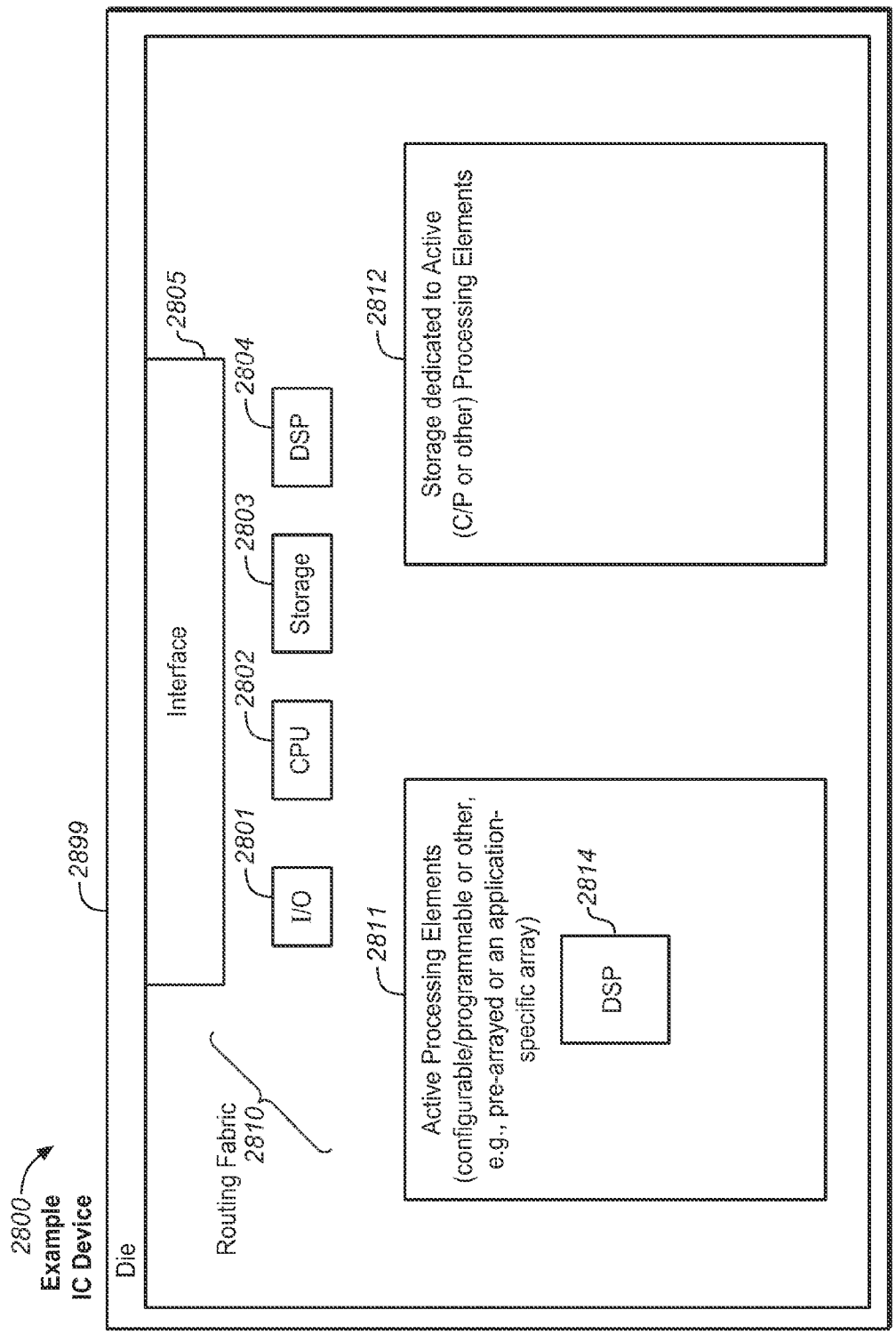
FIG. 28 depicts an example device, with which an embodiment of the present invention may be practiced.

FIG. 28 depicts an example IC device 2800, with which an embodiment of the present invention may be implemented, e.g., for assessing image quality over extended dynamic ranges and wide color gamuts and/or extending image and/or video dynamic range, e.g., as described herein. IC device 2800 may comprise a component of an encoder and/or decoder apparatus, in which the component functions in relation to the enhancements described herein. Additionally or alternatively, IC device 2800 may comprise a component of an entity, apparatus or system that is associated with display management, production facility, the Internet or a telephone network or another network with which the encoders and/or decoders functions, in which the component functions in relation to the enhancements described herein. Features and/or components of IC device 2800 are disposed in a die 2899. Die 2899 comprises a semiconducting material such as silicon (Si), Germanium (Ge) and/or a variety of other substances and/or mixtures.

IC device 2800 may have an input/output (I/O) feature 2801. I/O feature 2801 receives input signals and routes them via routing fabric 2810 to a central processing unit (CPU) 2802, which functions with storage 2803. I/O feature 2801 also receives output signals from other component features of IC device 2800 and may control a part of the signal flow over routing fabric 2810. A digital signal processing (DSP) feature performs at least function relating to discrete time signal processing. An interface 2805 accesses external signals and routes them to I/O feature 2801, and allows IC device 2800 to export signals. Routing fabric 2810 routes signals and power between the various component features of IC device 2800.

Active elements 2811 may comprise configurable and/or programmable processing elements (CPPE) 2811, such as arrays of logic gates may perform dedicated functions of IC device 2800, which in an embodiment may relate to expanding image and/or video dynamic range. Additionally or alternatively, active elements 2811 may comprise pre-arrayed (e.g., especially designed, arrayed, laid-out, photolithographically etched and/or electrically or electronically interconnected and gated) field effect transistors (FETs) or bipolar logic devices, e.g., wherein IC device 2800 comprises an ASIC. Storage 2812 dedicates sufficient memory cells for CPPE (or other active elements) 2811 to function efficiently. CPPE (or other active elements) 2811 may include one or more dedicated DSP features 2814.

Equivalents, Extensions, Alternatives and Miscellaneous

Example embodiments that relate to assessing image quality over extended dynamic ranges and/or wide color gamuts and/or extending dynamic range for images and video are thus described. In the foregoing specification, example embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising the steps of:
    accessing a first video signal that is represented in a first color space with a first color gamut which is related to a first dynamic range, and a second video signal that is represented in a second color space of a second color gamut, wherein the second color space is associated with a second dynamic range;
    converting the accessed first video signal to a converted video signal that is represented in the second color space of the second color gamut with the second dynamic range;
    processing the converted video signal and the accessed second video signal, wherein for at least one frame of the converted video signal and a corresponding frame of the second video signal the processing step comprises:
        applying a non-linear scaling function to the converted video signal to generate a first scaled video signal;
        applying the non-linear scaling function to the second video signal to generate a second scaled video signal; and
        applying a photographic mapping function to the first scaled video signal and the second scaled video signal to generate a first mapped video signal and a second mapped video signal; and
    based at least in part on the processing step, measuring a difference between the processed first mapped and second mapped video signals, wherein measuring the difference comprises:
        generating based at least in part on the first mapped video signal and the second mapped video signal a luminance comparison metric, a contrast comparison metric, and a structural comparison metric; and
        combining the luminance comparison metric, the contrast comparison metric, and the structural comparison metric to generate a quality metric which indicates how pixels of the first video signal match corresponding pixels of the second video signal.

2. The method as recited in claim 1 wherein the second dynamic range is greater than the first dynamic range.

3. The method as recited in claim 1 wherein the second color gamut is greater, broader or deeper than the first color gamut.

4. The method as recited in claim 1 wherein one or more of the first color space or the second color space comprises a RGB color space that has three color related components, wherein the color related components comprise a red component, a green component and a blue color component.

5. The method as recited in claim 1 wherein one or more of the processing or the difference measuring steps comprises an operation that is computed, performed or executed over one or more of properties of an image or video channel, the properties comprising one or more of intensity or color.

6. The method as recited in claim 1 wherein the first and second video signals comprise a plurality of one or more of frames, slices or fields, and wherein the method further comprises the steps of:
    measuring the quality metric for each of the frames, slices or fields as an individual quality metric;
    further processing the measured individual quality metrics; and
    generating an overall quality metric value for the first and second video signals.

7. The method of claim 1 wherein the photographic mapping function comprises computing $$L_d = \frac{L \cdot \left(1 + \frac{L}{C}\right)}{1 + L},$$

wherein L denotes an input of the mapping function, $L_d$ denotes the output of the mapping function, and C denotes a constant.

8. The method of claim 7 wherein the input L comprises a function of luminance pixels in an input frame of an input video signal to the photographic mapping function and C denotes a luminance value that will be mapped to "pure white."

9. The method of claim 8, wherein $$L = \frac{a}{\overline{Y}} \cdot Y,$$

wherein a denotes a constant, Y denotes an input pixel value in the frame of the an input video signal to the photographic mapping function, and $\overline{Y}$ represents a log-average pixel value associated with a scene of the input video signal to the photographic mapping function.

10. The method of claim 7, further comprising performing a color transformation step comprising converting the first mapped video signal and the second mapped video signal from an XYZ color format to a gamma-encoded RGB format.

11. The method of claim 1, wherein generating a quality metric Q(r,t) between a set of input pixels r of a reference signal and a set of input pixels t of a reference signal comprises computing:

$$Q(r,t) = [l(r,t)]^\alpha \cdot [c(r,t)]^\beta \cdot [s(r,t)]^\gamma,$$

where l(r,t) denotes the luminance comparison metric, c(r,t) denotes the contrast comparison metric, s(r,t) denotes the structural comparison metric, and $\alpha$, $\beta$, and $\gamma$ represent positive, larger than zero, constants.

12. The method of claim 11, wherein $$l(r,t) = \frac{2\mu_r \mu_t + C_1}{\mu_r^2 + \mu_t^2 + C_1}, \quad c(r,t) = \frac{2\sigma_r \sigma_t + C_2}{\sigma_r^2 + \sigma_t^2 + C_2}, \quad s(r,t) = \frac{\sigma_{rt} + C_3}{\sigma_r \sigma_t + C_3},$$

where $\mu_r$ and $\mu_t$ represent the local sample means of r and t, $\sigma_r$ and $\sigma_t$ represent the local sample standard deviations of r and t, and $C_1$, $C_2$ and $C_3$ comprise relatively small positive constants.

13. The method of claim 11, wherein $\alpha = \beta = \gamma = 1$.

* * * * *